US010533723B2

(12) United States Patent
Lee et al.

(10) Patent No.: US 10,533,723 B2
(45) Date of Patent: Jan. 14, 2020

(54) LIGHT LAMP FOR VEHICLE

(71) Applicant: LG Electronics Inc., Seoul (KR)

(72) Inventors: Oklyeol Lee, Seoul (KR); Sulki Park, Seoul (KR)

(73) Assignee: LG Electronics Inc., Seoul (KR)

( * ) Notice: Subject to any disclaimer, the term of this patent is extended or adjusted under 35 U.S.C. 154(b) by 88 days.

(21) Appl. No.: 15/816,044

(22) Filed: Nov. 17, 2017

(65) Prior Publication Data

US 2018/0135827 A1  May 17, 2018

(30) Foreign Application Priority Data

Nov. 17, 2016  (KR) .................. 10-2016-0153336

(51) Int. Cl.
*F21S 41/25* (2018.01)
*F21V 29/51* (2015.01)
(Continued)

(52) U.S. Cl.
CPC ............. *F21S 41/25* (2018.01); *F21S 41/16* (2018.01); *F21S 41/176* (2018.01); *F21S 41/28* (2018.01); *F21S 41/285* (2018.01); *F21S 41/295* (2018.01); *F21S 41/39* (2018.01); *F21S 43/26* (2018.01); *F21S 43/27* (2018.01); *F21S 43/37* (2018.01); *F21S 43/40* (2018.01); *F21S 45/47* (2018.01); *F21V 29/51* (2015.01); *F21V 29/76* (2015.01); *B60Q 1/04* (2013.01); *B60Q 1/34* (2013.01); *B60Q 1/44* (2013.01)

(58) Field of Classification Search
CPC .. F21S 41/25–275; F21S 41/295; F21S 45/40; F21S 45/46; B60Q 1/0029–0058
See application file for complete search history.

(56) References Cited

U.S. PATENT DOCUMENTS

2005/0105301 A1\* 5/2005 Takeda ................ F21S 41/16
362/545
2013/0107564 A1  5/2013 Yatsuda
(Continued)

FOREIGN PATENT DOCUMENTS

EP  2781408 A2  9/2014
EP  3086022 A2  10/2016
(Continued)

OTHER PUBLICATIONS

Extended European Search Report in European Application No. 17202064.6, dated Mar. 22, 2018, 7 pages.
(Continued)

*Primary Examiner* — Mariceli Santiago
(74) *Attorney, Agent, or Firm* — Fish & Richardson P.C.

(57) ABSTRACT

A light lamp for a vehicle includes a plurality of light function modules, each of the plurality of light function modules including: a light source module including: a light source configured to generate light; a light source lens disposed in front of the light source; and a reflection unit provided on a part of a front surface of the light source lens; a light distribution module disposed in front of the light source module and configured to receive the light from the light source module and to distribute the received light; and a dissipation module disposed behind the light source module and configured to dissipate heat generated by the light source.

17 Claims, 29 Drawing Sheets

(51) Int. Cl.
*F21V 29/76* (2015.01)
*F21S 43/37* (2018.01)
*F21S 41/20* (2018.01)
*F21S 41/29* (2018.01)
*F21S 43/40* (2018.01)
*F21S 43/27* (2018.01)
*F21S 45/47* (2018.01)
*F21S 41/39* (2018.01)
*F21S 43/20* (2018.01)
*F21S 41/16* (2018.01)
*F21S 41/176* (2018.01)
*B60Q 1/04* (2006.01)
*B60Q 1/34* (2006.01)
*B60Q 1/44* (2006.01)

(56) References Cited

U.S. PATENT DOCUMENTS

2016/0238206 A1  8/2016  Honda et al.
2016/0312978 A1* 10/2016  Park .................... F21V 7/0033
2017/0293052 A1* 10/2017  Park .................... F21S 43/00
2017/0305330 A1  10/2017  Park
2018/0135825 A1*  5/2018  Lee ..................... F21V 29/51

FOREIGN PATENT DOCUMENTS

| | | |
|---|---|---|
| EP | 3228925 A2 | 10/2017 |
| FR | 2853717 | 10/2004 |
| FR | 3022977 | 1/2016 |
| JP | 2008047383 | 2/2008 |
| JP | 2014500600 | 1/2014 |
| KR | 2010024423 A2 | 3/2010 |
| KR | 2012034049 A2 | 4/2012 |
| KR | 10-2013-0112577 | 10/2013 |
| KR | 10-2014-0133063 | 11/2014 |

OTHER PUBLICATIONS

European Office Action in European Application No. 17202064.6, dated Apr. 23, 2019, 5 pages.

* cited by examiner

LIGHT LAMP FOR VEHICLE

CROSS-REFERENCE TO RELATED APPLICATION

This application claims an earlier filing date and the right of priority to Korean Patent Application No. 10-2016-0153336, filed on Nov. 17, 2016, the contents of which are incorporated herein by reference in its entirety.

TECHNICAL FIELD

The present disclosure relates to a light lamp for a vehicle which includes a light function module composed of a light source module, a light distribution module, and a dissipation module.

BACKGROUND

A lighting device, such as a lamp, is installed in a vehicle to help provide a field of vision to a driver by providing illumination of object near the vehicle and notify a current driving state of the vehicle to the outside, such as to other vehicles or pedestrians.

The lighting device installed in the vehicle (hereinafter, referred to as a lighting device for a vehicle) may include a head lamp which emits light in a forward direction of the vehicle, and a rear lamp which indicates the direction of travel of the vehicle or application of a brake.

The lighting device for a vehicle may form a low beam or a high beam to provide outward visibility to a driver during night driving situations. Recently, light-emitting diodes (LEDs) having high power efficiency and a long lifespan have been increasingly incorporated into the lighting device for a vehicle.

A laser diode having a longer irradiation distance than that of an LED may also be used as a light source of the lighting device for a vehicle.

SUMMARY

Implementations disclosed herein provide a light lamp for a vehicle that includes a plurality of light function modules. In some implementations, each light function module includes components that are arranged to provide a light lamp that is more compact, efficient, and/or functional.

In one aspect, a light lamp for a vehicle includes a plurality of light function modules, each of the plurality of light function modules including: a light source module including: a light source configured to generate light; a light source lens disposed in front of the light source; and a reflection unit provided on a part of a front surface of the light source lens; a light distribution module disposed in front of the light source module and configured to receive the light from the light source module and to distribute the received light; and a dissipation module disposed behind the light source module and configured to dissipate heat generated by the light source.

Implementations may include one or more of the following features. For example, the light distribution module includes: a projection lens; and a light distribution case including: a light emission opening formed at a front side thereof; and a projection lens accommodating space, wherein the projection lens is mounted in the projection lens accommodating space.

In some implementations, the projection lens has a convex front surface, and at least part of the front surface is exposed to an outside of the light distribution case through the light emission opening.

In some implementations, the light distribution module further includes a projection lens retainer coupled to a rear surface of the light distribution case and configured to fix the projection lens to the light distribution case.

In some implementations, the light distribution module further includes a diffuser disposed behind the projection lens retainer and facing a rear surface of the projection lens.

In some implementations, the plurality of light function modules further includes a first light function module and a second light function module, the first light function module includes a first light distribution case on which a first projection lens is mounted, the second light function module includes a second light distribution case on which a second projection lens is mounted, and the first projection lens and the second projection lens have different curvatures.

In some implementations, the light source module includes a light emission body configured to accommodate the light source and the light source lens, and at least part of the light emission body is inserted into a rear of the light distribution case.

In some implementations, the light emission body includes a top-surface protrusion protruding from a top surface thereof, the light distribution case further includes a top-surface groove formed on a top surface thereof, and in a state in which the at least part of the light emission body is inserted into the light distribution case, the top-surface protrusion is fitted into the top-surface groove.

In some implementations, the light emission body further includes a bottom-surface protrusion protruding from a bottom surface thereof, the light distribution case further includes a bottom-surface groove formed in a bottom surface thereof, and in a state in which the at least part of the light emission body is inserted into the light distribution case, the bottom-surface protrusion is fitted into the bottom-surface groove.

In some implementations, the light emission body further includes a plurality of top-surface protrusions and a plurality of bottom-surface protrusions, and a first distance between the top-surface protrusions and a second distance between the bottom-surface protrusions are different.

In some implementations, the light emission body further includes a side-surface groove formed in a side surface thereof, the light distribution case further includes a side-surface protrusion protruding from a side surface thereof, and in a state in which the at least part of the light emission body is inserted into the light distribution case, the side-surface protrusion is fitted into the side-surface groove.

In some implementations, the plurality of light function modules includes: a first light function module; and a second light function module arranged vertically above or below the first light function module.

In some implementations, a first dissipation module of the first light function module includes a heat pipe disposed to contact a light source of the first light function module, and the heat pipe is disposed to contact a light source of the second light function module.

In some implementations, the first dissipation module of the first light function module further includes a dissipation plate in contact with the heat pipe.

In some implementations, the plurality of light function modules includes: a first light function module; and a third light function module horizontally spaced apart from the first light function module.

In some implementations, a first dissipation module of the first light function module includes a heat pipe disposed to contact a light source of the first light function module; and the heat pipe is disposed to contact a light source of the third light function module.

In some implementations, the first dissipation module of the first light function module further includes a dissipation plate in contact with the heat pipe.

In some implementations, the light lamp further includes an inner lens disposed in front of the plurality of light function modules, wherein the inner lens is disposed to face two or more of the plurality of light function modules.

In some implementations, the light lamp further includes an outer lens disposed in front of the inner lens.

In another aspect, a vehicle includes a plurality of wheels; a power source configured to drive at least one of the plurality of wheels; and the light lamp.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Various implementations of a light lamp for a vehicle are described herein. In some implementations, the light lamp includes a plurality of light function modules. Each light function module may include components that are arranged to provide a more compact, efficient, and/or functional light lamp.

For example, in some implementations, the components of the light lamp may be arranged to provide a more compact light lamp for a vehicle, using a smaller number of components.

In some implementations, a light lamp for a vehicle may include a light function module composed of a light source module, a light distribution module, and a dissipation module.

In some implementations, a number of components in a light source module may be reduced by using a common-type light source module and a common-type dissipation module, which may be used by each modules of a plurality of light function modules.

In some implementations, a light distribution module coupled to the light source module may be replaceable, thus providing a light function module that is modular and able to be replaced as needed to perform different functions.

In accordance with an implementation of the present disclosure, a light lamp for a vehicle may include a plurality of light function modules, wherein each of the plurality of light function modules comprises: a light source module having a light source and a light source lens which is disposed in front of the light source and includes a reflection unit provided on a part of a front surface of the light source lens; a light distribution module disposed in front of the light source module and configured to distribute light emitted by the light source lens; and a dissipation module disposed behind the light source module and configured to dissipate heat generated by the light source.

Figure 1:
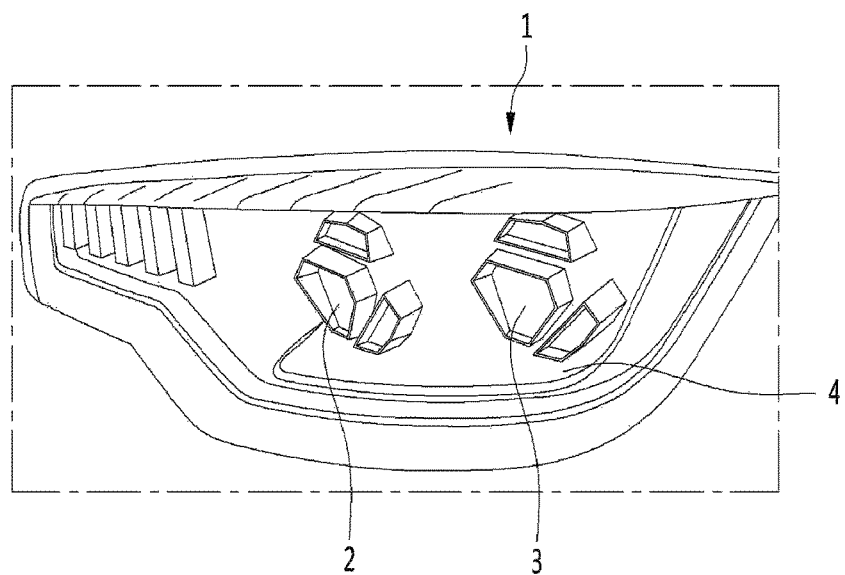
FIG. 1 is a perspective view illustrating an example of a light lamp for a vehicle according to an implementation of the present disclosure.
Figure 2:
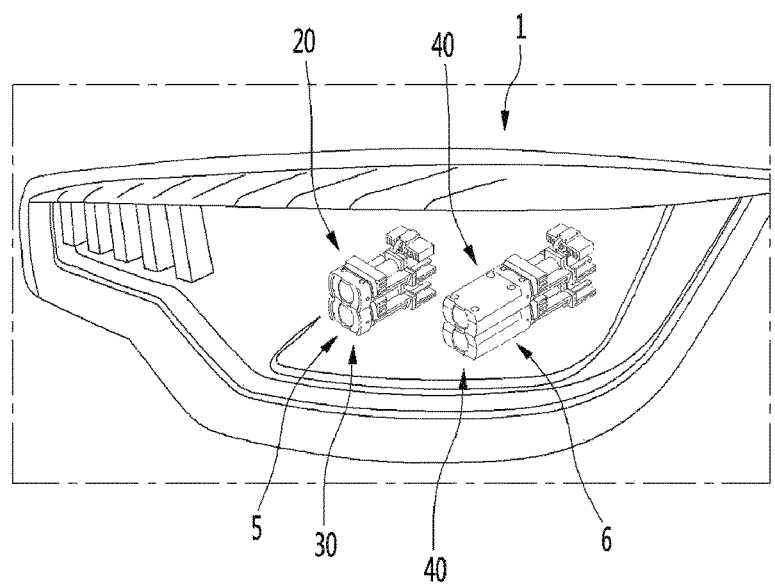
FIG. 2 is a perspective view illustrating the interior of the light lamp shown in FIG. 1.

FIG. 1 illustrates a perspective view of an example of a light lamp for a vehicle according to an implementation of the present disclosure; and FIG. 2 illustrates a perspective view of the interior of the light lamp shown in FIG. 1.

Referring to FIG. 1, a light lamp 1 for a vehicle according to an implementation of the present disclosure may include at least one inner lens 2 or 3 and an outer lens disposed in front of the inner lens 2 or 3.

For example, a plurality of inner lenses 2 and 3 may be provided inside the light lamp 1. The plurality of inner lenses 2 and 3 may be disposed behind the outer lens 4.

The outer lens 4 may be larger than the plurality of inner lenses 2 and 3, and may be disposed in front of the plurality of inner lenses 2 and 3 to protect the plurality of inner lenses 2 and 3.

The plurality of inner lenses 2 and 3 may be spaced apart from each other behind the outer lens 4. The plurality of inner lens 2 and 3 may be spaced apart from each other in a horizontal or vertical direction.

Referring to FIG. 2, the light lamp 1 may include at least one light module 5 or 6. For example, a plurality of light modules 5 and 6 may be provided inside the light lamp 1. The plurality of light modules 5 and 6 may be spaced apart from each other.

The light lamp 1 may include at least one light function module. For example, the light lamp 1 may include a plurality of light function modules.

The plurality of light function modules may include a first light function module 20 and a second light function module 30. The plurality of light function modules may further include one or more third light function modules 40, e.g., two third light function modules 40.

At least one of the first or second light function module 20 or 30 among the plurality of light function modules may have a function different from that of the third light function module 40. The two light function modules 40 among the plurality of light function modules may have the same function.

The light lamp 1 may include at least one high beam module, at least one booster module, and at least one low beam module. For example, the first light function module 20, the second light function module 30, and the third light function module 40 may provide a high beam module for emitting a high beam, a booster module for reinforcing light emitted by the high beam module, and a low beam module for emitting a low beam.

The light lamp 1 may be configured such that the number of modules of a particular type among the first light function modules 20, the second light function modules 30, and the third light function modules 40 may differ. For example, the light lamp 1 may include a single first light function module 20, a single second light function module 30, and a plurality of third light function modules 40.

The light lamp 1 may include a first light module 5 which may be provided by the first light function module 20 and the second light function module 30 that are coupled to each other. In addition, the light lamp 1 may include a second light module 6 which may be provided by the plurality of third light function modules 40 that are coupled to one another.

In this case, the first light module 5 may be spaced apart from the second light module 6.

For example, the first light function module 20 may be a high beam module for emitting a high beam, the second light function module 30 may be a booster beam module for emitting a booster beam, and each third light function module 40 may be a low beam module. In addition, the plurality of third light function modules 40 may be spaced apart from the first light function module 20 and the second light function module 30, and arranged in a vertical direction.

A third light function module 40 disposed higher than other third light function module(s) 40 ("top third light function module") may be horizontally spaced apart from the first light function module 20 and/or the second light function module 30. For example, the top third light function module may be horizontally spaced apart from the first light function module 20 which may be disposed higher than the second light function module 30.

In addition, a third light function module 40 positioned lower than other third light function module(s) 40 ("bottom third light function module") may be horizontally spaced apart from the first light function module 20 and/or the second light function module 30. For example, the bottom third light function module may be horizontally spaced apart from the second light function module 30 which may be disposed lower than the first light function module 20.

Referring back to FIG. 1, the lighting lamp for a vehicle may be configured with inner lenses 2 and 3. The number of inner lenses may be less than the number of modules of the plurality of light function modules.

The inner lenses 2 and 3 may be disposed in front of the plurality of light function modules 20, 30, and 40. The inner lenses 2 and 3 may be disposed to face light distribution modules including at least two light function modules among the plurality of light function modules.

For example, one of the plurality of inner lenses 2 and 3 (e.g., inner lens 2) may be disposed in front of the first light function module 20 and the second light function module 30, and a beam emitted by the second light function module 30 may pass through one of the plurality of inner lenses 2 and 3 together with a beam emitted by the first light function module 20.

In addition, the other one of the inner lenses 2 and 3 (e.g., inner lens 3) may be disposed in front of the plurality of third light function modules 40, and respective beams emitted by the plurality of third light function modules 40 may pass through the other inner lens 2 or 3 simultaneously or at different times.

In the case where two inner lenses 2 and 3 are disposed behind the outer lens 4, a first inner lens and a second inner lens may be spaced apart from each other. In this case, the first inner lens may be disposed in front of the first light function module 20 and the second light function module 30. In addition, the second inner lens may be disposed in front of the plurality of third light function modules 40.

Figure 3:
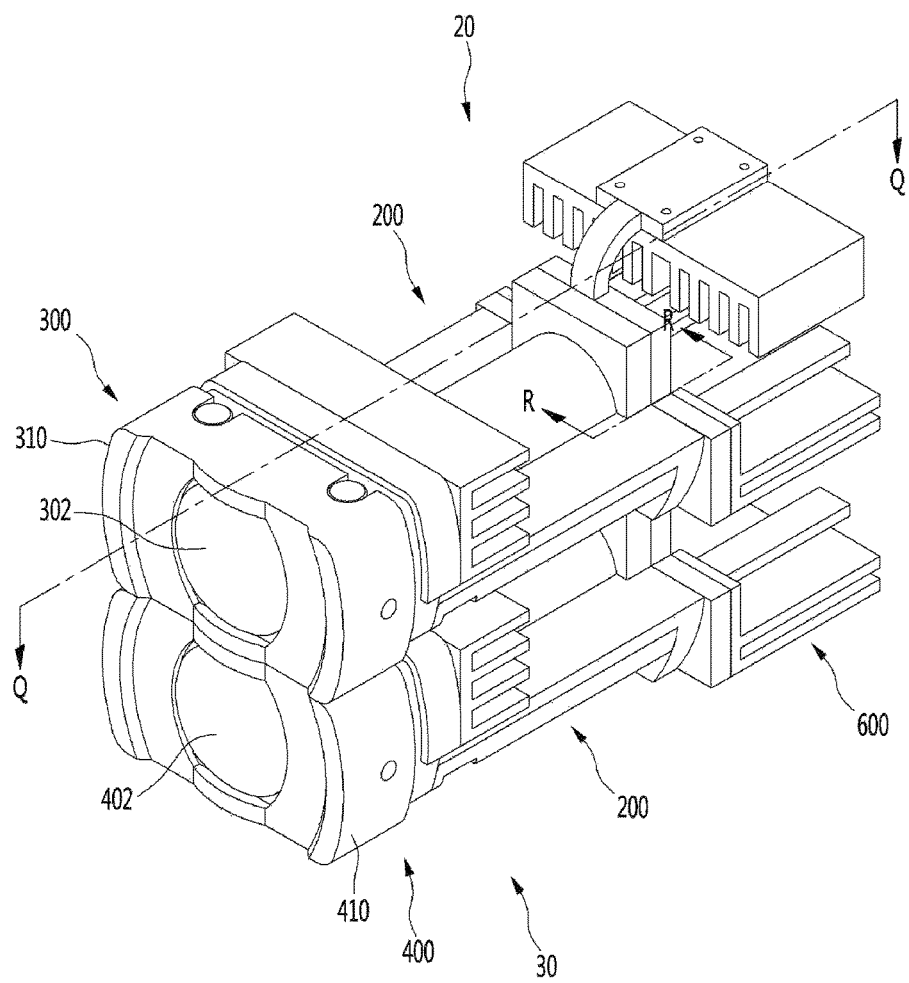
FIG. 3 is a perspective view illustrating an example of first and second light function modules shown in FIG. 2.
Figure 4:
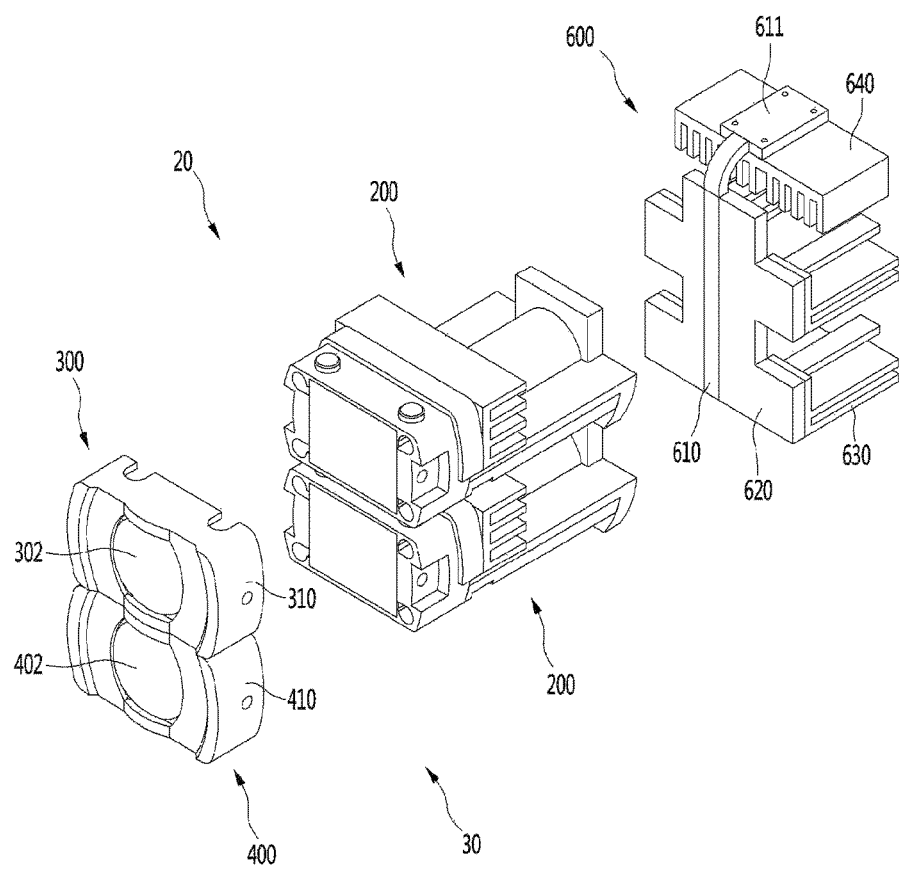
FIG. 4 is an exploded perspective view illustrating the first and second light function modules shown in FIG. 3.
Figure 5:
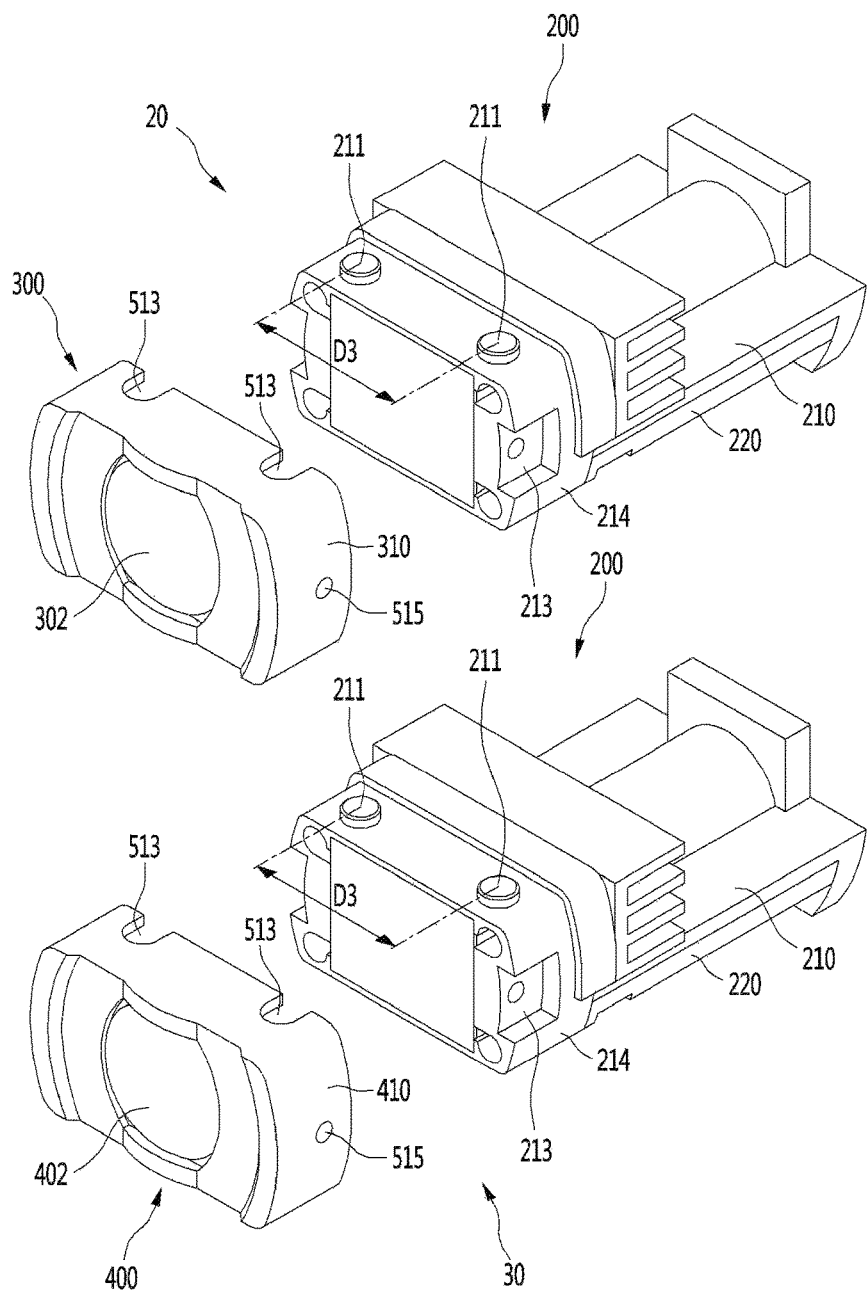
FIG. 5 is a first perspective view illustrating the light distribution module shown in FIG. 3 in a detached state from a light source module.
Figure 6:
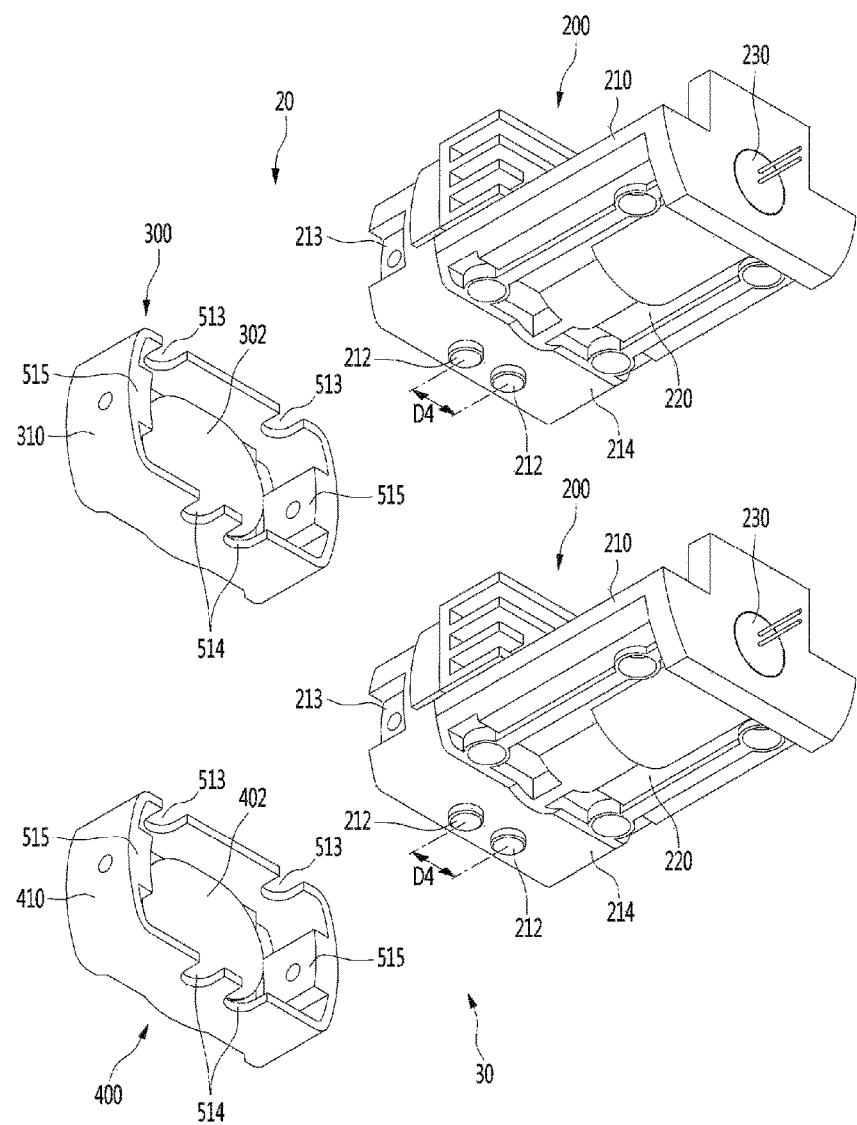
FIG. 6 is a second perspective view illustrating the light distribution module shown in FIG. 3.

FIG. 3 illustrates a perspective view of an example of first and second light function modules shown in FIG. 2; FIG. 4 illustrates an exploded perspective view of the first and second light function modules shown in FIG. 3; FIG. 5 illustrates a first perspective view of the light distribution module shown in FIG. 3 in a detached state from a light source module; and FIG. 6 illustrates a second perspective view of the light distribution module shown in FIG. 3.

Figure 7:
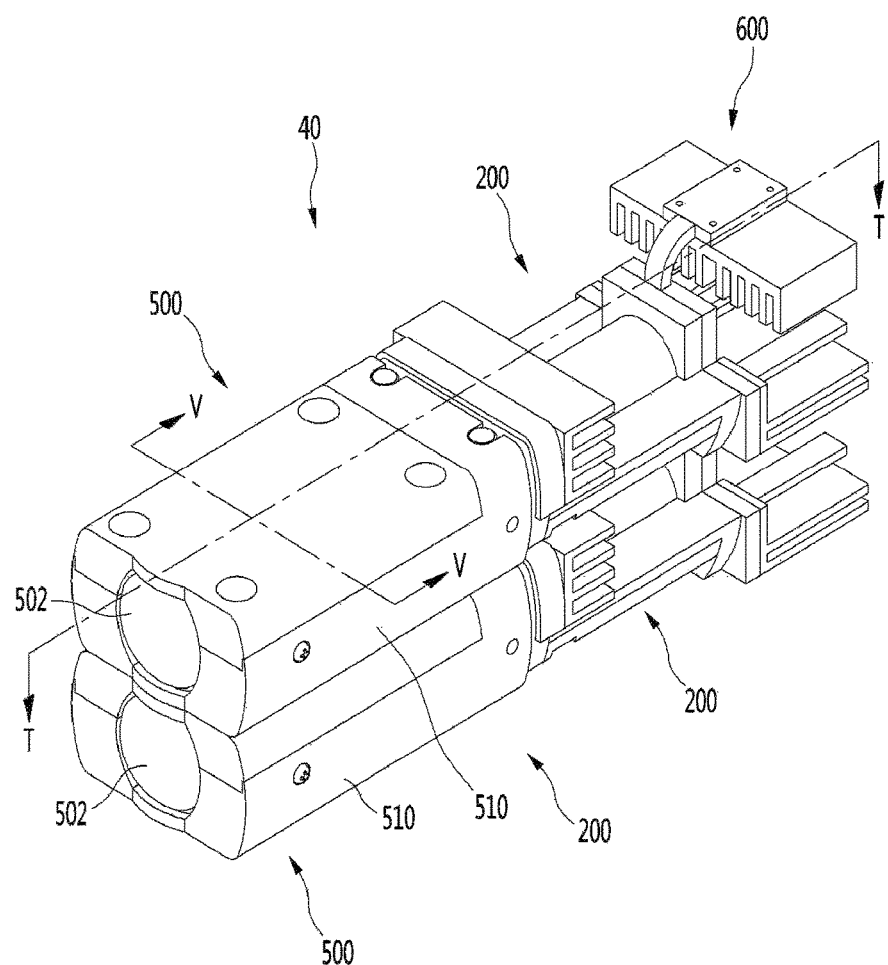
FIG. 7 is a perspective view illustrating an example of a third light function module shown in FIG. 2.
Figure 8:
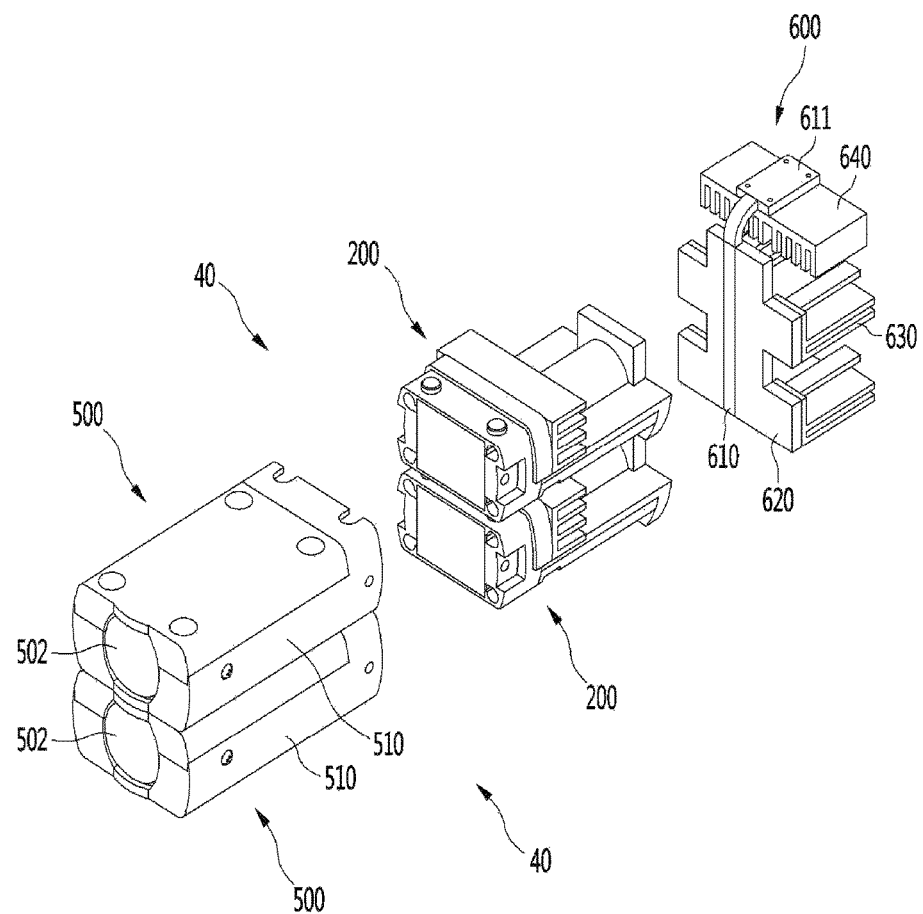
FIG. 8 is an exploded perspective view illustrating the third light function module shown in FIG. 7.
Figure 9:
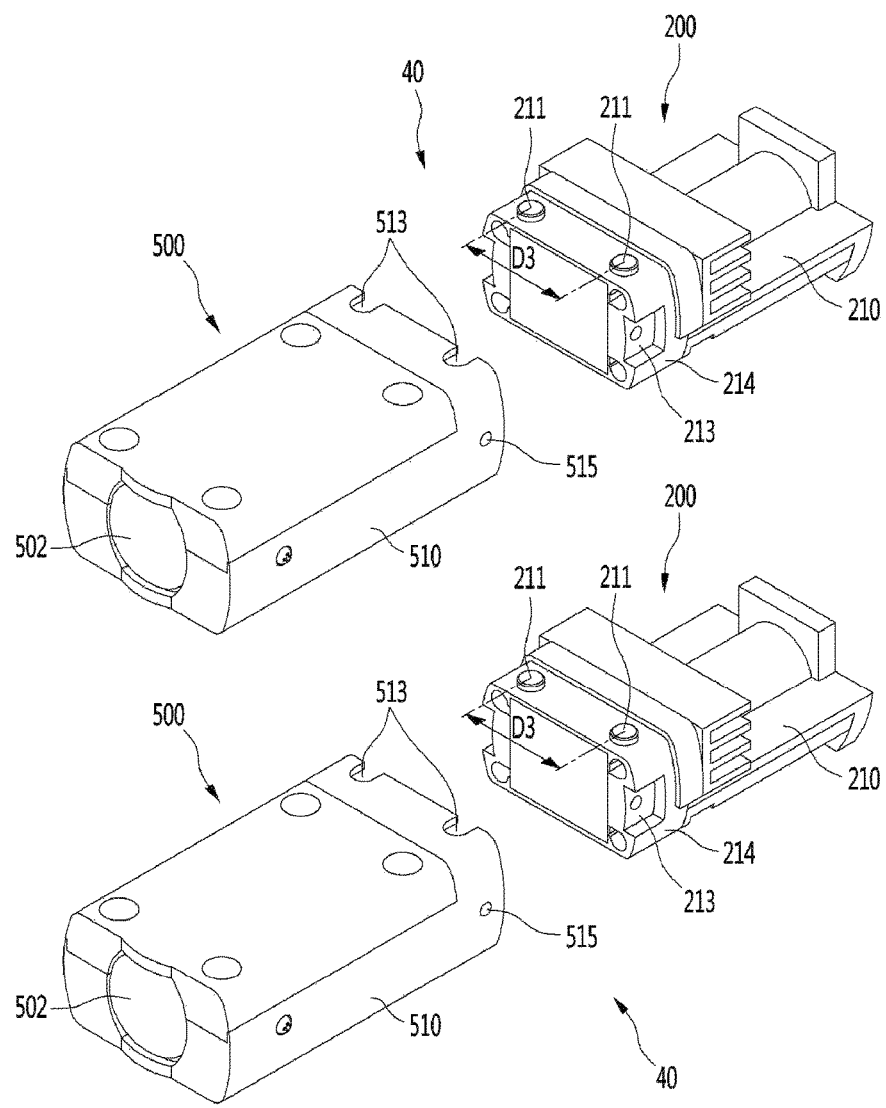
FIG. 9 is a first perspective view illustrating the light distribution module shown in FIG. 7 in a detached state from a light source device.
Figure 10:
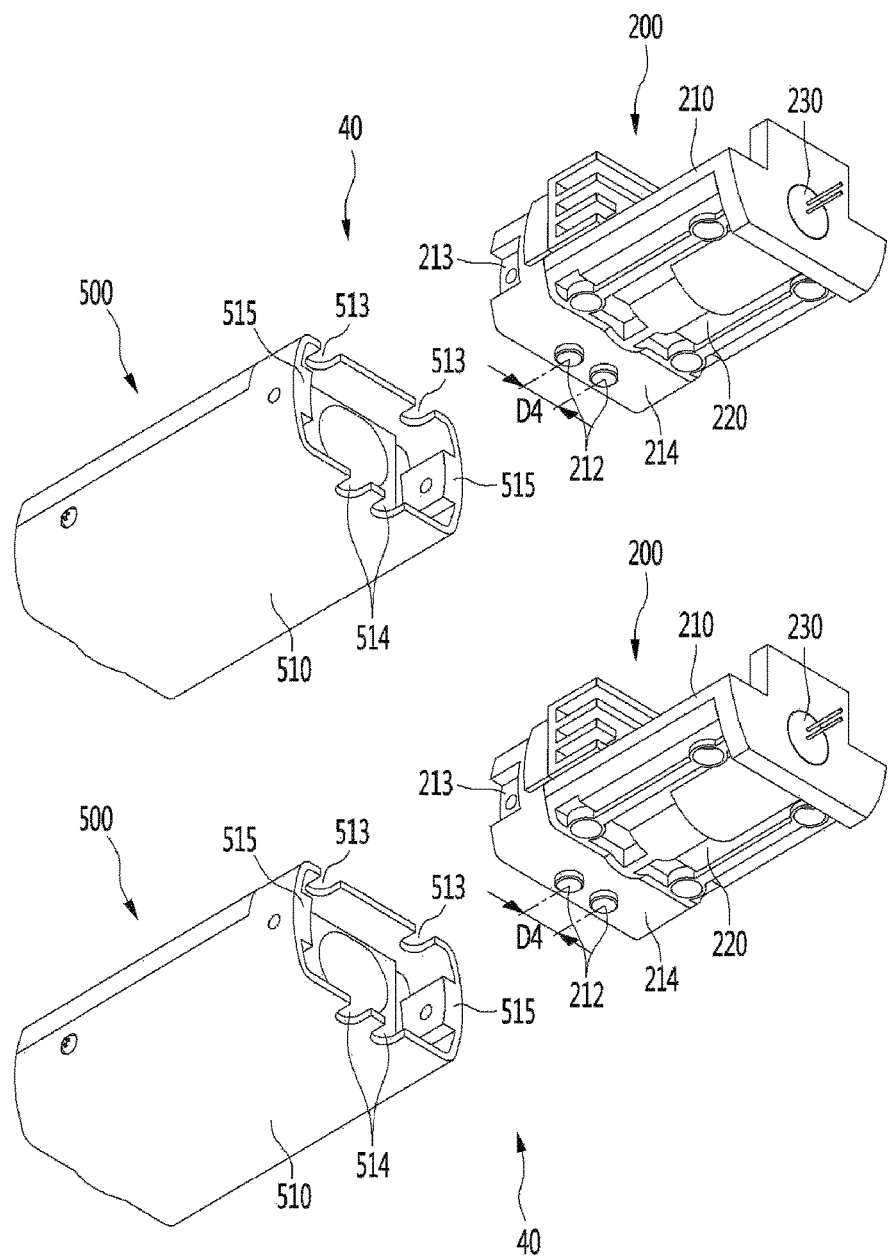
FIG. 10 is a second perspective view illustrating the light distribution module shown in FIG. 7 in a detached state from a light source device.

FIG. 7 illustrates a perspective view of an example of a third light function module shown in FIG. 2; FIG. 8 illustrates an exploded perspective view of the third light function module shown in FIG. 7; FIG. 9 illustrates a first perspective view of the light distribution module shown in FIG. 7 in a detached state from a light source device; and FIG. 10 illustrates a second perspective view of the light distribution module shown in FIG. 7 in a detached state from a light source device.

Referring to FIG. 3, each of the plurality of light function modules (e.g., 20, 30, and 40) may include a light source module 200, a light distribution module, and a dissipation module 600.

The light source module 200 may be configured to emit light toward the light distribution module.

The light distribution module may be disposed in front of the light source module 200, and distribute the light emitted by the light source module 200. The light distribution module may distribute light, which is incident from the light source module 200, in various ways to form various patterns. Different light distribution modules may be distinguished by respective light distribution patterns. When coupled to the light source module 200, the light distribution module may function to provide a high beam or a low beam.

The light distribution module may include a projection lens, and a light distribution case having a projection lens accommodating space.

The projection lens may be mounted in the projection lens accommodating space. The projection lens may have a convex front surface.

The light distribution case may have a light emission opening formed at the front thereof. At least a part of the front surface of the projection lens may be exposed to an outside of the light distribution case through the light emission opening.

The light distribution module may further include a projection lens retainer for fixing the projection lens onto the light distribution case. The projection lens retainer may be coupled to a rear surface of the light distribution case.

The light distribution module may further include a diffuser disposed behind the projection lens retainer. The diffuser may face a rear surface of the projection lens.

The light distribution module may be coupled to at least one of the light source module 200 and the dissipation module 600, or may form a part of light function modules, together with the light source module 200 and the dissipation module 600.

A function of each of the plurality of light function modules 20, 30, and 40 may be determined based on a characteristic of the light distribution module disposed in front of the light source module 200.

For example, the lighting lamp for a vehicle may include three types of the light distribution module 300, 400, and 500. The lighting lamp for a vehicle may include a first light distribution module 300, a second light distribution module 400, and a third light distribution module 500. The first light distribution module 300, the second light distribution module 400, and the third light distribution module 500 may be respectively coupled to the light source module 200.

The first light distribution module 300, the second light distribution module 400, and the third light distribution module 500 may have different light distribution patterns.

Referring to FIGS. 3 through 6, the first light function module 20 may include a first light distribution case 310 into which a first projection lens 302 is mounted. In addition, the second light function module 30 may include a second light distribution case 410 into which a second projection lens 402 is mounted.

The first projection lens 302 and the second projection lens 402 may have different curvatures, and the first light function module 20 and the second light function module 30 may form different light distribution patterns. In some implementations, the light distribution area of the first light function module 20 may be larger than that of the second light function module 30. In some implementations, the light distribution area of the second light function module 30 may overlap a part of the light distribution area of the first light function module 20.

Referring to FIGS. 7 through 10, the third light function module 40 may include a third light distribution case 510 into which a third projection lens 502 is mounted. A shield may be embedded in the third light function module 40, and a low beam may be formed according to a cut-off line of an opening formed in the shield.

Depending on a desired function of a light function module, a light distribution module may be the first light distribution module 300 for emitting a high beam, the second light distribution module 400 for emitting a booster beam, or the third light distribution module 500 for emitting a low beam.

A common-type light source module 200 and a common-type dissipation module 600 may be used across light function modules having different light distribution modules. By using the common-type light source module 200 and the common-type dissipation module 600, manufacturing cost of the light lamp for a vehicle may potentially be reduced.

The first light distribution module 300, the second light distribution module 400, and the third light distribution module 500 may be different from each other. The first light distribution module 300, the second light distribution module 400, and the third light distribution module 500 may be selectively used for each of the plurality of light function modules 20, 30, and 40.

For example, the first light distribution module 300 may be connected to at least one of the light source module 200 and the dissipation module 600 to thereby function as the first light function module 20. In addition, the second light distribution module 400 may be connected to at least one of the light source module 200 and the dissipation module 600 to thereby function as the second light function module 30. In addition, the third light distribution module 500 may be connected to at least one of the light source module 200 and the dissipation module 600 to thereby function as the third light function module 40.

Now turning to the coupling of the light distribution modules to the light source module, each of the first light distribution module 300, the second light distribution module 400, and the third light distribution module 500 may be coupled to the light source module 200, for example in an identical manner and using identical coupling structures.

Referring to FIGS. 5, 6, 9, and 10, a top-surface protrusion 211, a bottom-surface protrusion 212, and a side-surface groove 213 may be formed in the light source module 200.

In addition, as illustrated in FIGS. 5 and 6, a top-surface groove 513, a bottom-surface groove 514, and a side-surface protrusion 515 may be formed in each of the first light distribution module 300 and the second light distribution module 400. As illustrated in FIGS. 9 and 10, a top-surface groove 513, a bottom-surface groove 514, and a side-surface protrusion 515 may be formed in the third light distribution module 500.

Referring back to FIG. 5, the light source module 200 may include a light emission body 210 in which the top-surface protrusion 211, the bottom-surface protrusion 212, and the side-surface groove 213 are formed. A light emission head part 214 may be formed at the front of the light emission body 210. The top-surface protrusion 211, the bottom-surface protrusion 212, and the side-surface groove 213 may be formed in the light emission head part 214.

The top-surface protrusion 211 may be formed in a top surface of the light emission head part 214. A plurality of top-surface protrusions 211 being spaced apart from each other may be provided.

The bottom-surface protrusion 212 may be formed in a bottom surface of the light emission head part 214. A plurality of bottom-surface protrusions 212 being spaced apart from each other may be provided.

The side-surface groove 213 may be formed in a side surface of the light emission head part 214. A plurality of side-surface grooves 213 spaced apart from each other may be provided.

Two top-surface protrusions 211 and two bottom-surface protrusions 212 may be formed.

A distance D3 between the two top-surface protrusions 211 and a distance D4 between the two bottom-surface protrusions 212 may be different from each other. Such configuration may help prevent the first light distribution module 300, the second light distribution module 400, and the third light distribution module 500 from being incorrectly assembled, e.g., assembled upside down.

The top-surface groove 513, the bottom-surface groove 514, and the side-surface protrusion 515 may be formed in the first light distribution case 310 of the first light distribution module 300, the second light distribution case 410 of the second light distribution module 400, and the third light distribution case 510 of the third light distribution module 500.

With reference to FIGS. 3 to 6, a structure coupling the first light distribution module 300 and the light source module 200 is hereinafter described.

At least part of a light source module 200 included in the first light function module 20 may be inserted into the first light distribution module 300. At least part of the light emission body 210 of the light source module 200 included in the first light function module 20 may be inserted into the rear of the first light distribution case 310.

A top-surface groove 513 may be formed in a top surface of the first light distribution case 310. A plurality of top-surface grooves 513 may be formed in the top surface of the first light distribution case 310 and spaced apart from each other. The top-surface protrusion 211 of the light source module 200 included in the first light function module 20 may be fitted into the top-surface groove 513 of the first light distribution case 310 thereby to be engaged therewith.

A bottom-surface groove 514 may be formed in a bottom surface of the first light distribution case 310. A plurality of bottom-surface grooves 514 may be formed in the bottom surface of the first light distribution case 310 and spaced apart from each other. The bottom-surface protrusion 212 of the light source module 200 included in the first light function module 20 may be fitted into the bottom-surface groove 514 of the first light distribution case 310 thereby to be engaged therewith.

A side-surface protrusion 515 may be formed in a side surface of the first light distribution case 310. A plurality of side-surface protrusions 515 may be formed in side surfaces of the first light distribution case 310, and may be respectively formed in one side surface and the other side surface of the first light distribution case 310 and thus spaced apart from each other. The side-surface protrusion 515 may be fitted into the side-surface groove 213 of the light source module 200 included in the first light function module 20 thereby to be engaged therewith.

The first light distribution module 300 may be coupled to the light source module 200 included in the first light function module 20 through a fastening member which penetrates the side-surface protrusion 515 and the side-surface groove 213.

In addition, with reference to FIGS. 3 to 6, a structure coupling the second light distribution module 400 and the light source module 200 is hereinafter described.

At least part of a light source module 200 included in the second light function module 30 may be inserted into the second light distribution module 400. At least part of the light emission body 210 of the light source module 200 included in the second light function module 300 may be inserted into the rear of the second light distribution case 410.

A top-surface groove 513 may be formed in a top surface of the second light distribution case 410. A plurality of top-surface groove 513 may be formed in the top surface of the second light distribution case 410 and spaced apart from each other. The top-surface protrusion 211 of the light source module 200 included in the second light function module 30 may be fitted into the top-surface groove 513 thereby to be engaged therewith.

A bottom-surface groove 514 may be formed in a bottom surface of the second light distribution case 410. A plurality of bottom-surface grooves 514 may be formed in the bottom surface of the second light distribution case 410 and spaced apart from each other. The bottom-surface protrusion 212 of the light source module 200 included in the second light function module 30 may be fitted into the bottom-surface groove 514 thereby to be engaged therewith.

A side-surface protrusion 515 may be formed in a side surface of the second light distribution case 410. A plurality of side-surface protrusions 515 may be formed in side surfaces of the second light distribution case 410, and may be respectively formed in one side surface and the other side surface of the second light distribution case 410 and thus spaced apart from each other. The side-surface protrusion 515 may be fitted into the side-surface groove 213 of the light source module 200 included in the second light function module 30 thereby to be engaged therewith.

The second light distribution module 400 may be coupled to the light source module 200 through a fastening member which penetrates the side-surface protrusion 515 and the side-surface groove 213.

With reference to FIGS. 7 to 10, a structure coupling the third light distribution module 500 and the light source module 200 is hereinafter described.

At least part of a light source module 200 included in the third light function module 40 may be inserted into the third light distribution module 500. At least part of the light emission body 210 of the light source module 200 included in the third light function module 40 may be inserted into the rear of the third light distribution case 510.

A top-surface groove 513 may be formed in a top surface of the third light distribution case 510. A plurality of top-surface grooves 513 may be formed in the top surface of the third light distribution case 510 and spaced apart from each other. The top-surface protrusion 211 of the light source module 200 included in the third light function module 40 may be fitted into the top-surface groove 513 thereby to be engaged therewith.

A bottom-surface groove 514 may be formed in a bottom surface of the third light distribution case 510. A plurality of bottom-surface grooves 514 may be formed in the bottom surface of the third light distribution case 510 and spaced apart from each other. The bottom-surface protrusion 212 of the light source module 200 included in the third light function module 40 may be fitted into the bottom-surface groove 514 thereby to be engaged therewith.

A side-surface protrusion 515 may be formed in a side surface of the third light distribution case 510. A plurality of side-surface protrusions 515 may be formed in side surfaces of the third light distribution case 510, and may be respectively formed in one side surface and the other side surface of the third light distribution case 410 and thus spaced apart from each other. The side-surface protrusion 515 may be fitted into the side-surface groove 213 of the light source module 200 included in the third light function module 40 thereby to be engaged therewith.

The third light distribution module 500 may be coupled to the light source module 200 through a fastening member which penetrates the side-surface protrusion 515 and the side-surface groove 213.

In some implementations, the dissipation module 600 may be connected to the light source module 200 to dissipate heat of the light source module 200. The dissipation module 600 may be disposed at the rear of the light source module 200 so as to dissipate heat generated by a light source 230 of the light source module 200. The light source 230 will be described later.

Figure 11:
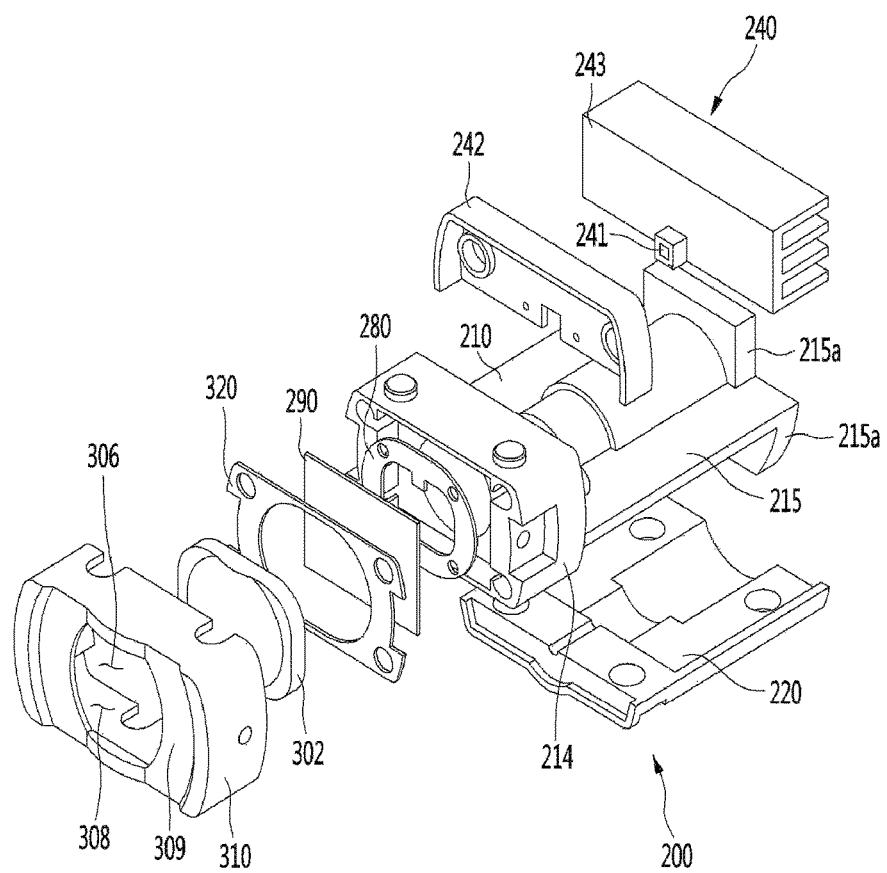
FIG. 11 is a first exploded perspective view illustrating an example of a light source module according to a first implementation of the present disclosure.
Figure 12:
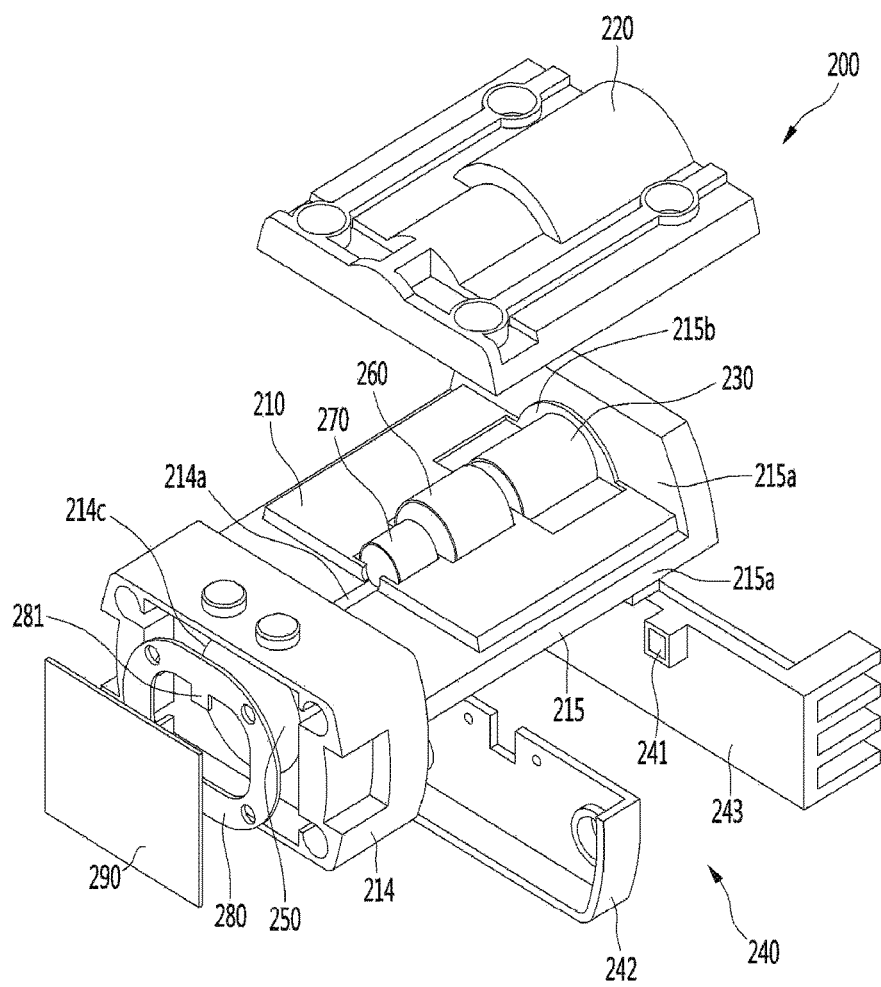
FIG. 12 is a second exploded perspective view illustrating an example of a light source module according to a first implementation of the present disclosure.
Figure 13:
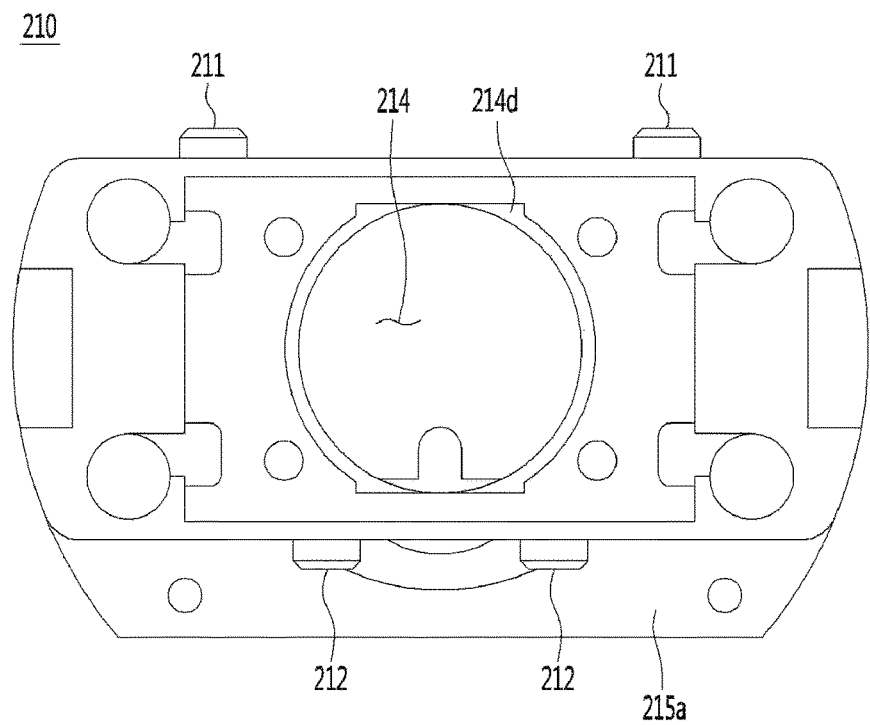
FIG. 13 is a front view illustrating an example of a light emission body of the light source module according to the first implementation of the present disclosure.
Figure 14:
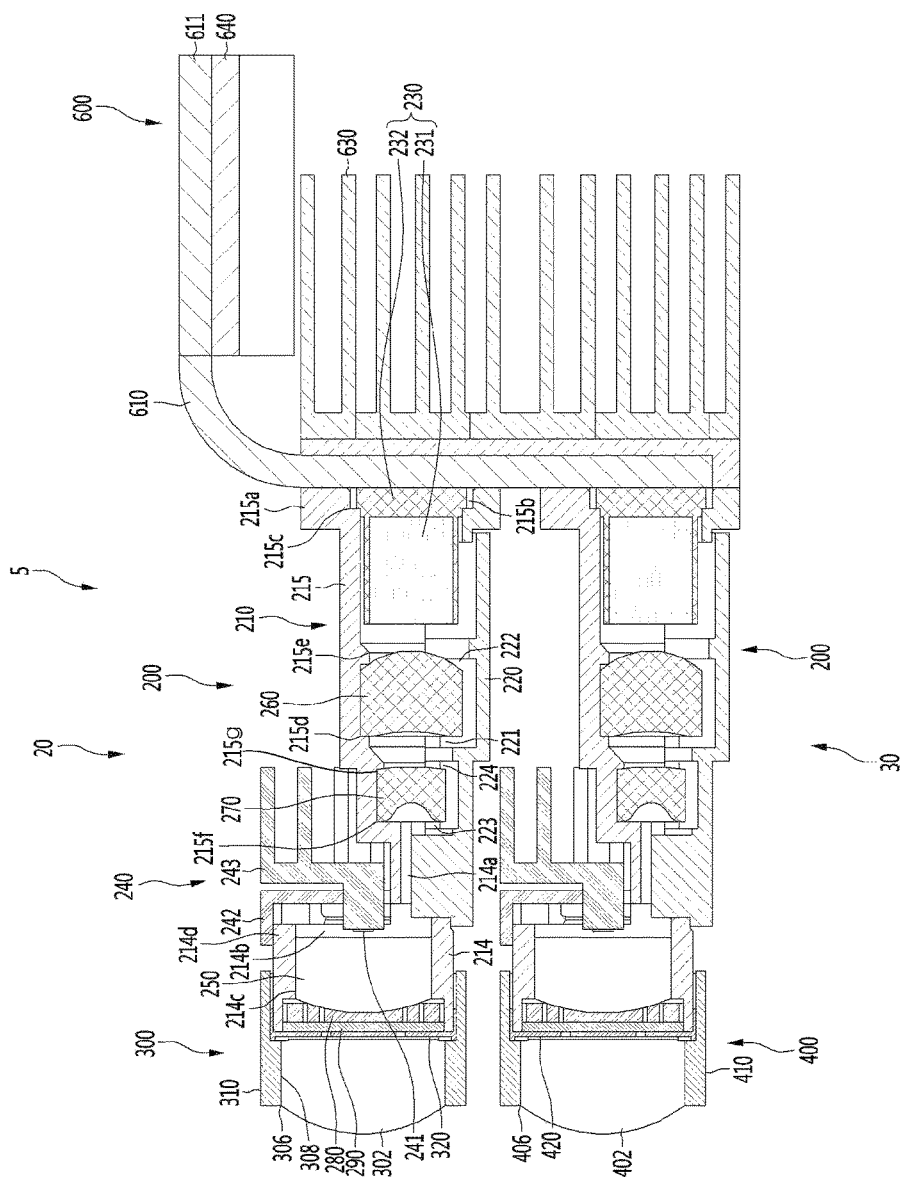
FIG. 14 is a cross-sectional view taken along line Q-Q of FIG. 3.
Figure 15:
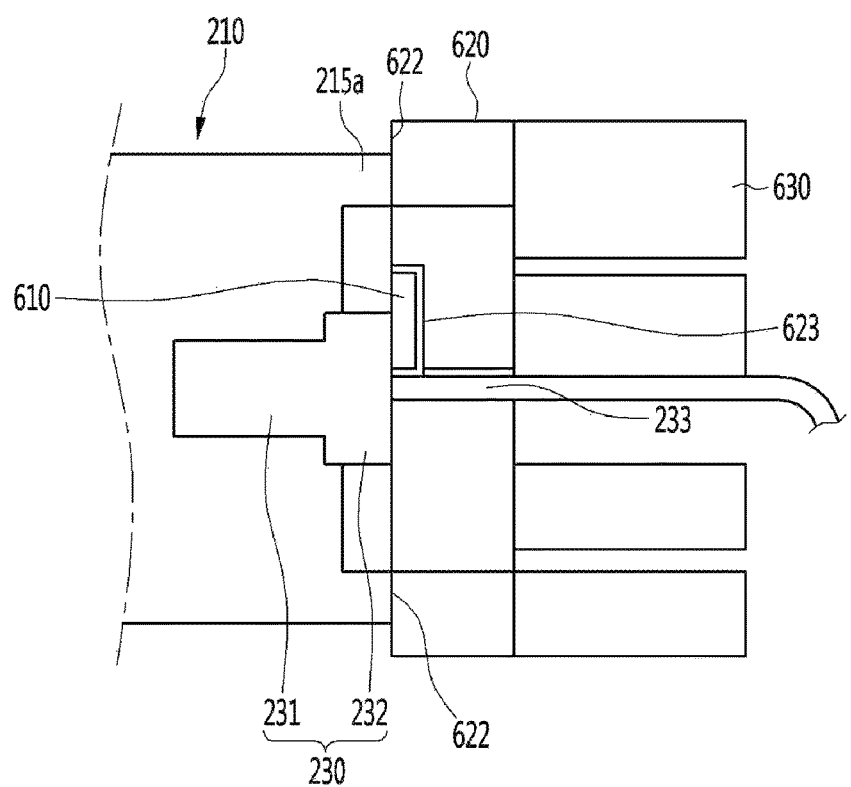
FIG. 15 is a cross-sectional view taken along line R-R of FIG. 3.

FIG. 11 illustrates a first exploded perspective view of an example of a light source module according to a first implementation of the present disclosure; FIG. 12 illustrates a second exploded perspective view of an example of a light source module according to a first implementation of the present disclosure; FIG. 13 illustrates a front view of an example of a light emission body of the light source module according to the first implementation of the present disclosure; FIG. 14 illustrates a cross-sectional view taken along line Q-Q of FIG. 3; and FIG. 15 illustrates a cross-sectional view taken along line R-R of FIG. 3.

Figure 16:
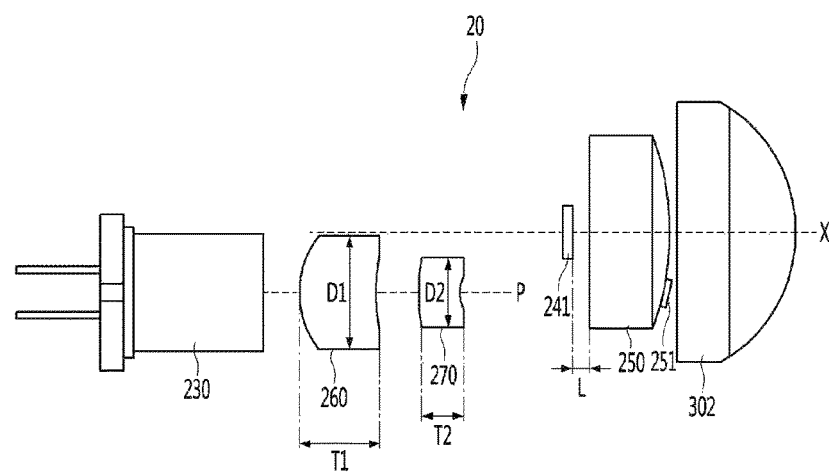
FIG. 16 is a configuration diagram illustrating an example of an optical system of the light source module according to the first implementation of the present disclosure.
Figure 17:
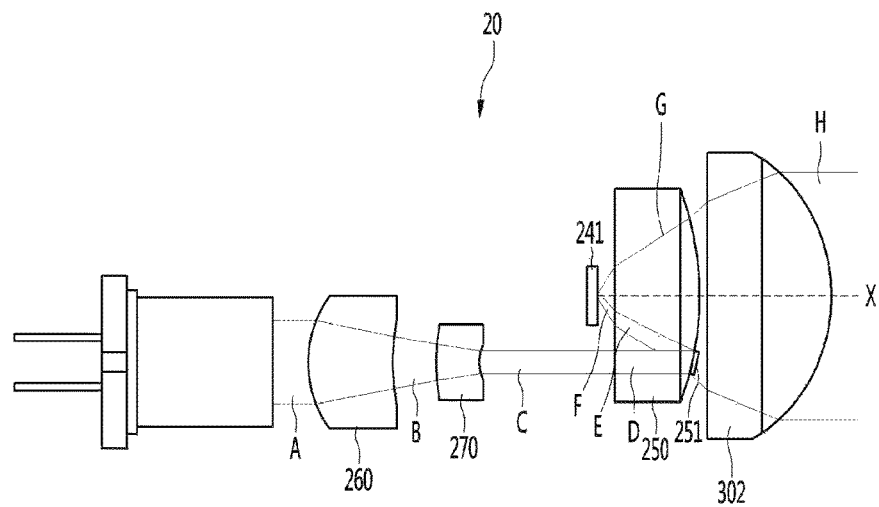
FIG. 17 is a diagram illustrating an optical path of the optical system shown in FIG. 16.

FIG. 16 illustrates a configuration diagram of an example of an optical system the light source module according to the first implementation of the present disclosure; and FIG. 17 illustrates an optical path of the optical system shown in FIG. 16;

A first light function module 20 out of a plurality of light function modules may include a first light distribution module 300, a light source module 200, and a dissipation module 600.

In addition, a second light function module 20 out of the plurality of light function modules may include a second light distribution module 400, a light source module 200, and a dissipation module 600.

A common-type light source module 200 may be used, regardless of respective type of each of the plurality of light function modules, and the light source module 200 will be hereinafter described.

Referring to FIGS. 11 through 16, the light source module 200 may include: a light source 230; a light source lens 250; a light emission body 210 accommodating the light source 230 and the light source lens 250; a light emission cover 220 covering the light emission body 210; and a phosphor assembly 240 connected to the light emission body 210. In addition, the light source module 200 may include a reflection unit 251 which reflects light, passing through the light source lens 250, toward the light source lens 250. The reflection unit 251 may be provided to reflect incident light toward a phosphor 241 of the phosphor assembly 240. The reflection unit 251 may be disposed at the front of the light source lens 250. The reflection unit 251 may be integrated with the light source lens 250 or spaced apart from the light source lens 250.

The light source 230 may be configured to receive electrical energy and convert the electrical energy into optical energy, and may be a light-emitting source, such as an ultra high voltage (UHV) mercury lamp, a light-emitting diode (LED), or a laser diode.

It is preferable that the light source 230 is highly collimated, have high efficiency, and enables long-distance illumination. For example, such a light source may be provided using a laser diode. In addition, a laser diode that emits in the blue region of the visible spectrum with high efficiency is preferred.

The light source 230 may emit light toward the reflection unit 251. The light source 230 may emit light toward the light source lens 250, and the light emitted toward the light source lens 250 may pass through the light source lens 250 and then be incident on the reflection unit 251. The light source 230 may emit light toward the rear surface of the light source lens 250, and the light incident on the rear surface of the light source lens 250 from the light source 230 may pass through the light source lens 250 and then be incident on the rear surface of the reflection unit 251.

The light source 230 may be coupled to the dissipation module 600 configured to dissipate heat generated by the light source 230.

Between the light source 230 and the light source lens 250, there may be a light reducer which reduces the size (e.g., beam width, beam diameter) of light emitted by the light source 230 and then outputs the light toward the reflection unit 251. The light emitted by the light source 230 may pass through the light reducer and then be output toward the reflection unit 251.

The light reducer may include a plurality of reducer lenses. The plurality of reducer lenses may include a first reducer lens 260 and a second reducer lens 270.

The light source lens 250 may be disposed before the light source 230. The reflection unit 251 may be provided on a part of the front surface of the light source lens 250.

The light emission cover 220 may cover the light emission body 210. The light emission body 210 may be configured to accommodate the light source 230, the light source lens 250, the first reducer lens 260, and the second reducer lens 270.

The light emission body 210 and the light emission cover 220 may form a light source accommodating space in which the light source 230 is accommodated. The light source 230 may be inserted into the light source accommodating space and be accommodated therein.

The light emission body 210 and the light emission cover 220 may form a light source lens accommodating space in which the light source lens 250 is accommodated. The light source lens 250 may be inserted into the light source lens accommodating space and be accommodated therein.

The light emission body 210 and the light emission cover 220 may form a first reducer lens accommodating space in which the first reducer lens 260 is accommodated. The first reducer lens 260 may be inserted into the first reducer lens accommodating space and be accommodated therein.

The light emission body 210 and the light emission cover 220 may form a second reducer lens accommodating space in which the second reducer lens 270 is accommodated. The second reducer lens 270 may be inserted into the second reducer lens accommodating space and be accommodated therein.

The light emission body 210 may include: a light emission head part 214 in which the light source lens 250 is mounted; and a light emission tail part 215 connected to the rear of the light emission head part 214. A light entrance hole 214a and a phosphor assembly coupling hole 241b may be formed at the rear of the light emission head part 214.

The phosphor assembly 240 may be coupled to the rear of the light emission head part 214 and may cover the phosphor assembly coupling hole 214b.

The light emission cover 220 may be coupled to the light emission body 210 so as to cover the light emission tail part 215.

In the case where a light source lens insertion hole 214c is formed at the front of the light emission head part 214 and the light source lens 250 is mounted in the light source lens insertion hole 214c, the front surface of the light source lens 250 may be exposed to an outside of the light emission head part 214 through the light source lens insertion hole.

The light emission head part 214 may include a light source lens stopping protrusion 214d formed along an inner circumferential surface of the light source lens insertion hole 214c. In addition, the rear surface of the light source lens 250 may come into contact with the light source lens stopping protrusion 214d.

The light source module 200 may be coupled to the front surface of the light emission head part 214. The light source module 200 may further include a light source lens retainer 280 for fixing the light source lens 250 to the light emission head part 214. The light source lens retainer 280 may be coupled to the light emission head part 214 through a fastening member.

The light source lens retainer 280 coupled to the light emission head part 214 may be disposed to contact the front surface of the light source lens 250. The light source lens retainer 280 may press the front surface of the light source lens 250.

The light source lens 250 may be disposed between the light source lens stopping protrusion 214d and the light source lens retainer 280. Being disposed between the light source lens stopping protrusion 214d and the light source lens retainer 280, the light source lens 250 may be fixed or constrained in a longitudinal direction of the light emission body 210.

The light source lens retainer 280 may include a light blocking section 281 which faces at least part of the front surface of the light source lens 250.

In the case where the reflection unit 251 is provided on the front surface of the light source lens 250, the light blocking section 281 may be disposed to face the reflection unit 251. Light emitted by the light source 230 may be reflected by the reflection unit 251. However, light scattered or diffusely-reflected by the reflection unit 251 may not be incident on the phosphor 241 but may be emitted toward the front of the light source lens 250. In this case, the light blocking section 281 of the light source lens retainer 280 may block the light reflected by the reflection unit 251, but not the light reflected by the phosphor 241. For example, the light blocking section 281 may block light which is emitted toward the front of the light source lens 250 without passing through the phosphor 241.

The light source lens 250 may be larger than the phosphor 241 and the reflection unit 251. In addition, the light source lens 250 may be disposed in front of the phosphor 241 to protect both the phosphor 241 and the reflection unit 251.

The light source lens 250 may have a circular or polygonal shape. The light source lens 250 may include a front surface, a rear surface, and a circumferential surface.

The front surface of the light source lens 250 may be a curved surface that is convex toward the front of the light source lens 250. The rear surface of the light source lens 250 may be a flat surface or a curved surface that is concave toward the front of the light source lens 250.

The light source lens 250 may have an optical axis X. The optical axis X of the light source lens 250 may be a rotation symmetry axis or a central axis of the light source lens 250 and may refer to a straight line passing through the center of the front surface of the light source lens 250 and the center of the rear surface of the light source lens 250. The light source lens 250 may be a condenser lens having a convex front surface, and the front surface of the light source lens 250 may be symmetric with respect to the optical axis X.

The phosphor 241 may be disposed behind the light source lens 250 and is configured convert a wavelength of light reflected by the reflection unit 251 and reflect the wavelength-converted light toward the light source lens 250. For example, the phosphor 241 may be a reflective phosphor.

Heat may be generated during the wavelength conversion process. Accordingly, the phosphor 241 is preferably spaced apart from the light source lens 250. For example, the phosphor 241 may be disposed behind the light source lens 250 and spaced apart from the light source lens 250. More specifically, the phosphor 241 may be disposed to face the rear surface of the light source lens 250 and may reflect light toward the rear surface of the light source lens 250.

In some implementations, the phosphor 241 may be disposed on the optical axis X of the light source lens 250 and spaced apart from the rear surface of the light source lens 250. The front surface of the phosphor 241 may be in parallel to the rear surface of the light source lens 250.

Alternatively, the phosphor 241 may be disposed off of the optical axis X of the light source lens 250. However, in this case, the resulting efficiency may be lower because a region of the light source lens 250 through which the light reflected by the phosphor 241 passes is smaller than the case where the phosphor 241 is disposed on the optical axis X of the light source lens 250. Accordingly, the phosphor 241 is preferably disposed on the optical axis X of the light source lens 250.

Now turning to the reflective phosphor, the phosphor 241 may include a wavelength conversion layer disposed to face the rear surface of the light source lens 250, and a phosphor reflection unit disposed at the rear of the wavelength conversion layer.

The wavelength conversion layer may be a wavelength conversion film and may include an opto-ceramic. The wavelength conversion layer may be disposed in front of the reflection unit and convert a wavelength of light reflected by the reflection unit. The wavelength conversion layer may be a wavelength conversion film that converts incident light of the blue wavelength band ("blue light") into light of the yellow wavelength band ("yellow light"). The wavelength conversion layer may include a yellow opto-ceramic.

The phosphor reflection unit may include a plate and a reflective coating layer coated on an outer surface of the plate. For example, the plate may be made of metal. The phosphor reflection unit may support the wavelength conversion layer, and light passing through the wavelength conversion layer may be reflected by the phosphor reflection unit toward the rear surface of the light source lens 250.

When blue light is reflected by the phosphor reflection unit toward the phosphor 241, a part of the blue light is reflected by the surface of the wavelength conversion layer. The remaining part of the blue light then enters the wavelength conversion layer, excites the wavelength conversion layer, and is converted into yellow light. The converted yellow light may be reflected by the phosphor reflection unit toward the front of the wavelength conversion layer.

The mixture of the blue light reflected from the surface of the wavelength conversion layer and the yellow light emitted toward the front of the wavelength conversion layer produce white light that is emitted toward the front of the phosphor 241. The white light may pass through the light source lens 250 and then be output toward the front of the light source lens 250.

Unlike a laser beam travelling in a straight line, the white light emitted toward the front of the phosphor assembly 240 may be scattered in various directions (e.g., radially, diffusely). The light source lens 250 disposed in front of the phosphor assembly 240 may concentrate the scattered white light.

However, while light is scattered in the wavelength conversion layer of the phosphor 241, yellow light (or wavelength-converted light) may be scattered more widely than blue light (or non-wavelength converted light).

Due to such differences in scattering areas, there may be a region where the blue light is not mixed with the yellow light. As a result, for example, a yellow ring may be generated around the white light by the yellow light that has not been mixed with the blue light.

The yellow ring may deteriorate color purity of light emitted toward the front of the light source module 200.

The light source module 200 may be disposed in front of the light source lens retainer 280 and may further include a diffuser 290 which faces the front surface of the light source lens 250. By appropriately scattering the light emitted by the light source lens 250, the diffuser 290 may mitigate the generation of the yellow ring.

A front-to-rear width of the lighting lamp for a vehicle may depend on a distance L between the phosphor 241 and the light source lens 250, and it is preferable that the phosphor 241 is disposed close to the light source lens 250 while mitigating potential thermal damage to the light source lens 250.

The phosphor assembly 240 may include a phosphor 241, a bracket 242, and a dissipation member 243. Light emitted by the light source 230 may be reflected by the reflection unit 251 and then be incident on the phosphor 241. In such cases, light may be concentrated on the phosphor 241, thereby generating heat. Accordingly, a structure that enables dissipating the heat generated in the phosphor 241 may be necessary. The dissipation member 243 may help dissipate the heat generated by the phosphor 241. For example, the phosphor 241 may be accommodated in the dissipation member 243. As another example, the phosphor 241 may be disposed to contact the dissipation member 243.

The dissipation member 243 may include a contact plate which comes into contact with the phosphor 241, and a dissipation fin which protrudes from the contact plate. The contact plate may be attached to the rear surface of the phosphor 241.

The bracket 242 may be connected to the dissipation member 243. The bracket 242 may be connected to the light emission body 210. The bracket 242 may connect the phosphor 241 and the dissipation member 243 to the light emission body 210.

The bracket 242 may be fixed to the rear surface of the light emission head part 214, and the phosphor 241 may be disposed to face the rear surface of light source lens 250. In addition, the phosphor 241 may be a reflective phosphor configured to convert a wavelength of light reflected by the reflection unit 251 and reflect the wavelength-converted light toward the light source lens 250. The phosphor 241 may be disposed on the optical axis of the light source lens 250.

In another example, the phosphor assembly 240 may include: a phosphor 241 which converts a wavelength of incident light and reflects the wavelength-converted light; and a dissipation member 243 which comes in contact with the rear surface of the phosphor 241. The dissipation member 243 may be coupled directly to a light emission body 210. In this case, the dissipation member 243 may act as a bracket 242. The light emission body 210 includes: a light emission head part 214 in which the light source lens 250 is mounted; and a light emission tail part 215 which is connected to the rear of the light emission head part 214. A light entrance hole 214a and a phosphor assembly coupling hole 214b are formed at the rear of the light emission head part 214. The dissipation member 243 may include: a dissipation body; and a phosphor holder which is connected to the dissipation body and comes into contact with the phosphor 241. The phosphor holder may be inserted into the phosphor assembly coupling hole 214b, the dissipation body may be connected to the rear surface of the light emission head part 214, and the phosphor 241 may be disposed in the phosphor holder to face the rear surface of the light source lens 250.

The position of the reflection unit 251 may depend on the position of the phosphor 241. For example, in the case where the phosphor 241 is disposed behind the light source lens 250, the reflection unit 251 may be spaced apart from the light source lens 250 and behind the light source lens 250; may be provided on the rear surface of the light source lens 250; may be provided on the front surface of the light source lens 250; or may be spaced apart from the light source lens 250 and disposed in front of the light source lens 250.

In case where the reflection unit 251 is spaced apart from the light source lens 250 and disposed behind the light source lens 250, the reflection unit 251 may reflect light emitted by the light source 230, toward a space between the phosphor 241 and the light source lens 250.

In case where the reflection unit 251 is provided on the rear surface of the light source lens 250 and integrated with the light source lens 250, the reflection unit 251 may reflect light emitted by the light source 230, toward a space between the phosphor 241 and the light source lens 250.

In case where the reflection unit 251 is provided on the front surface of the light source lens 250 and integrated with the light source lens 250, the reflection unit 251 may reflect light, emitted by the light source 230 and passing through the light source lens 250, toward the light source lens 250 so that the reflected light is reflected again toward the phosphor 241.

In case where the reflection unit 251 is spaced apart from the light source lens 250 and disposed in front of the light source lens 250, the reflection unit 251 may reflect light emitted by the light source 230 and passing through the light source lens 250, toward the light source lens 250 so that the reflected light is reflected again toward the phosphor 241.

In the case the reflection unit 251 is disposed in front of or behind the light source lens 250 to be spaced apart from the light source lens 250, an increased number of components of the lighting lamp for a vehicle may be required and the size of the lighting lamp may increase due to a distance between the light source lens 250 and the reflection unit 251.

Accordingly, the reflection unit 251 is preferably integrated with the rear surface or the front surface of the light source lens 250 to make the lighting lamp compact with a reduced number of components.

In the case where the reflection unit 251 is provided on the entire rear surface or the entire front surface of the light source lens 250, the reflection unit 251 may reflect light, reflected by the phosphor 241 in a backward direction, so that the light reflected by the phosphor 241 cannot be output through the front surface of the light source lens 250.

Accordingly, the reflection unit 251 is preferably provided on a part of the rear surface of the light source lens 250 or a part of the front surface of the light source lens 250. Additionally, the reflection unit 251 is preferably large enough for the light source lens 250 to secure a sufficient light emission region. Furthermore, the reflection unit 251 is disposed off of the optical axis X of the light source lens 250. In addition, the reflection unit 251 is preferably disposed between the optical axis X and the circumferential surface of the light source lens 250.

The reflection unit 251 may be provided on a part of the rear surface of the light source lens 250 or a part of the front surface of the light source lens 250. The reflection unit 251 may be configured to reflect light, emitted by the light source 230, toward the phosphor 241.

The reflection unit 251 may reflect the incident light toward the rear side of the light source lens 250.

The position of the reflection unit 251 is preferably determined by considering a distance between the phosphor 241 and the light source lens 250. For example, since the phosphor 241 is preferably disposed close to the rear surface of the light source lens 250, the reflection unit 251 is preferably provided on the front surface of the light source lens 250.

In such a configuration, the reflection unit 251 may be provided on a part of the front surface of the light source lens 250, and light emitted by the light source 230 or a reducer may pass through the light source lens 250 and then be incident on the reflection unit 251. In addition, the light reflected by the reflection unit 251 may pass through the light source lens 250 and then be incident on the phosphor 241. Light whose wavelength is converted by the phosphor 241 may pass through the light source lens 250 and then be emitted forward.

In such a configuration, the light source lens 250 may be a 3-path lens through which light passes three times, and the lighting lamp for a vehicle may be made compact due to the 3-path lens.

In cases where the reflection unit 251 is formed on a part of a convex front surface of the light source lens 250, the reflection unit may be formed to have an arc-shaped cross section that correspond to the convex front surface. Additionally, when viewed from a front viewpoint of the light source lens 250, the reflection unit 251 may have a circular or polygonal shape.

The reflection unit 251 may be a concave mirror 571 formed in the front surface of the light source lens 250. The reflection unit 251 may have a convex front surface and a concave rear surface.

The front surface of the reflection unit 251 may face a light distribution module 300, which will be described later, and may be disposed between the light source lens 250 and the light distribution module 300 thereby to be protected by them.

In some implementations, the reflection unit 251 may be a reflective coating layer coated on the front surface of the light source lens 250 while avoiding a region around the optical axis X of the light source lens 250. In some implementations, the reflection unit 251 may be a coating layer provided on a part of the front surface of the light source lens 250. For example, the reflection unit 251 may be a coating layer provided on a part of the front surface of the light source lens 250, while avoiding a region around the optical axis X of the light source lens 250. In some implementations, the reflection unit 251 may be a reflection sheet attached to the front surface of the light source lens 250, while avoiding a region around the optical axis X of the light source lens 250.

The light source lens 250 may have a convex front surface, and the reflection unit 251 may be formed to have an arc-shaped cross-section.

Alternatively, the reflection unit 251 may be a concave mirror formed in the front surface of the light source lens 250.

The light emission body 210 may include: a light emission head part 214 in which the light source lens 250 is mounted; and a light emission tail part 215 which is connected toward the rear of the light emission head part 214. A flange section 215a may be formed at the rear of the light emission tail part 215.

The light emission cover 220 may be disposed between the flange section 215a and the light emission head part 214 and may cover a portion (e.g., a lower portion) of the light emission body 210.

The light source module 200 may include a light reducer that reduces a width of light emitted by the light source 230. The light reducer may be disposed between the light source lens 250 and the light source 230. For example, the light reducer may be disposed between the rear surface of the light source lens 250 and the front surface of the light source 230 and spaced apart from the light source lens 250 and the light source 230, respectively.

The light reducer may be disposed between the light emission body 210 and the light emission cover 220. In addition, a plurality of light reducers may be provided.

The light reducer may be spaced apart from the optical axis X of the light source lens 250. For example, a part of the light reducer may fall on the optical axis X of the light source lens 250, but an optical axis P of the light reducer may be spaced apart from the light source lens 250.

The light reducer may be disposed behind the light source lens 250 and output light in a direction parallel to the optical axis X of the light source lens 250. To this end, the optical axis P of the light reducer may be in parallel to the optical axis X of the light source lens 250.

In some implementations, the light reducer may include: a first reducer lens 260; and a second reducer lens 270 which is spaced apart from the first reducer lens 260 and configured to reduce a width of light that is transmitted by the first reducer lens 260. While a reduction in width of light is described here, in general, a diameter or size of light may be reduced by the light reducer.

The first reducer lens 260 may be disposed between the light emission body 210 and the light emission cover 220. Alternatively, the first reducer lens 260 may be disposed between the light source 230 and the light source lens 250 in a light emission direction.

The second reducer lens 270 may be disposed between the light emission body 210 and the light emission cover 220. Alternatively, the second reducer lens 270 may be disposed between the first reducer lens 260 and the light source lens 250 in a light emission direction.

The first reducer lens 260 has a light entrance surface and a light exit surface, and the second reducer lens 270 has a light entrance surface and a light exit surface.

The light exit surface of the first reducer lens 260 and the light entrance surface of the second reducer lens 270 may be spaced apart from each other. The light exit surface of the first reducer lens 260 and the light entrance surface of the second reducer lens 270 may be spaced apart from each other in a direction parallel to the optical axis X of the light source lens 250. The separation between the first reducer lens 260 and the second reducer lens 270 may be an air gap.

An optical axis of the first reducer lens 260 and an optical axis of the light source lens 250 may be spaced apart from each other. In addition, an optical axis of the second reducer lens 270 and an optical axis of the light source lens 250 may be spaced apart from each other.

In addition, an optical axis of the first reducer lens 260 and an optical axis of the second reducer lens 270 may coincide with each other.

The first reducer lens 260 and the second reducer lens 270 may be spaced apart from each other in a front-to-rear direction. The light exit surface of the first reducer lens 260 and the light entrance surface of the second reducer lens 270 may be spaced apart from each other in the front-to-rear direction.

The first reducer lens 260 may be disposed between the light source 230 and the second reducer lens 270, and the second reducer lens 270 may be disposed between the first reducer lens 260 and the light source lens 250.

The light entrance surface of the first reducer lens 260 may face the light source 230.

The optical axis P of the first reducer lens 260 may coincide with the optical axis of the second reducer lens 270.

The light exit surface of the second reducer lens 270 may face the rear surface of the first light source lens 250. The light exit surface of the second reducer lens 270 preferably does not face the dissipation member 243 or the phosphor 241.

Each of the first reducer lens 260 and the second reducer lens 270 may have a convex light entrance surface. Each of the first reducer lens 260 and the second reducer lens 270 may have a concave light exit surface through which light is output.

The rear surface of the first reducer lens 260 may be a light entrance surface that is a curved surface concave toward the rear of the first reducer lens 260. Light incident from the light source 230 may be refracted by the convex light entrance surface such that the light passing through the first reducer lens 260 is progressively reduced in width or diameter.

The front surface of the first reducer lens 260 may be a light exit surface that is a curved surface concave toward the rear of the first reducer lens 260. The light exit surface may be concave over its entire surface, or concave over a central region of the light exit surface.

A part of the light exit surface of the first reducer lens 260 may face the light entrance surface of the second reducer lens 270.

The rear surface of the second reducer lens 270 may be a light entrance surface that is a curved surface convex toward the rear of the second reducer lens 270. Light output by the first reducer lens 260 and passed through the air between the first reducer lens 260 and the second reducer lens 270 may be refracted by the convex light entrance surface of the second reducer lens 270, and light passing through the second reducer lens 270 may be progressively reduced in width or diameter.

The front surface of the second reducer lens 270 may be a light exit surface that is a curved surface concave toward the rear of the second reducer lens 270. The light exit surface may be concave over its entire surface, or concave over a central region of the light exit surface.

The first reducer lens 260 may have a convex light entrance surface, and the second reducer lens 270 may have a concave light exit surface.

The entire light exit surface of the second reducer lens 270 may face the rear surface of the light source lens 250.

A diameter D2 of the second reducer lens 270 may be smaller than a diameter D1 of the first reducer lens 260. A thickness T2 of the second reducer lens 270 may be thinner than a thickness T1 of the first reducer lens 260.

Since light is primarily reduced by the first reducer lens 260, the second reducer lens 270 may be formed smaller than the first reducer lens 260 for the purpose of a more efficient use of an interior space of the light lamp.

The light entrance surface of the first reducer lens 260 and the light entrance surface of the second reducer lens 270 may have the same curvature or different curvature.

A degree of reduction in width of light passing through the first reducer lens 260 may primarily depend on curvature of the light entrance surface of the first reducer lens 260. For example, by increasing the curvature of the light entrance surface of the first reducer lens 260, the width or diameter of light passing through the first reducer lens 260 may be further.

Accordingly, by increasing the curvature of the light entrance surface of the light reducer lens 260, the size of each of the second reducer lens 270, the reflection unit 251, and the light source lens 250 may be reduced.

Light whose width is primarily reduced by the first reducer lens 260 may be incident on the light entrance surface of the second reducer lens 270. Accordingly, the light entrance surface of the second reducer lens 270 is preferably formed not to excessively reduce the width or the diameter of the light.

For example, in the case where the light entrance surface of the first reducer lens 260 and the light entrance surface of the second reducer lens 270 have different respective curvatures, the curvature of the light entrance surface of the first reducer lens 260 is preferably greater than the curvature of the light entrance surface of the second reducer lens 270.

The light exit surface of the first reducer lens 260 and the light exit surface of the second reducer lens 270 may have the same curvature or different curvature.

A width of light output by the first reducer lens 260 may be changed according to the curvature of the light exit surface of the first reducer lens 260.

The light exit surface of the first reducer lens 260 may have a curvature where light passing through the light exit surface is output in a direction parallel to the optical axis of the first reducer lens 260. In addition, the light exit surface of the first reducer lens 260 may have a curvature configured such that a width of light passing through the light exit surface of the first reducer lens 260 is progressively reduced between the light exit surface of the first reducer lens 260 and the light entrance surface of the second reducer lens.

A width of light incident on the reflection unit 251 may vary depending on a curvature of the light exit surface of the second reducer lens 270. The light exit surface of the second reducer lens 270 is preferably shaped to allow light passing through the light exit surface of the second reducer lens 270 to be incident on the reflection unit 251 in a direction parallel to the optical axis of the optical axis of the second reducer lens 270.

In the case where the light exit surface of the first reducer lens 260 and the light exit surface of the second reducer lens 270 have different respective curvatures, the curvature of the light exit surface of the second reducer 270 is preferably greater than the curvature of the light exit surface of the first reducer lens 260.

The light emission body 210 may be disposed to contact the circumferential surface of the first reducer lens 260. Similarly, the light emission cover 220 may be disposed to contact the circumferential surface of the first reducer lens 260.

Referring to FIG. 14, the light emission body 210 may further include a first reducer stopping protrusion 215d and a first reducer fixing protrusion 215e. The first reducer lens 260 may be disposed between the first reducer stopping protrusion 215d and the first reducer fixing protrusion 215e.

The first reducer stopping protrusion 215d, for example, may be disposed in front of the first reducer lens 260. As another example, the first reducer stopping protrusion 215d may be disposed to contact the front surface of the first reducer lens 260.

The first reducer fixing protrusion 215e, for example, may be disposed behind the first reducer lens 260. As another example, the first reducer fixing protrusion 215e may be disposed to contact the rear surface of the first reducer lens 260.

The light emission cover 220 may further include a first reducer stopping protrusion 221 and a first reducer fixing protrusion 222, and the first reducer lens 260 may be disposed between the first reducer stopping protrusion 221 and the first reducer fixing protrusion 222.

The first reducer stopping protrusion 221, for example, may be disposed in front of the first reducer lens 260. As another example, the first reducer stopping protrusion 221 may be disposed to contact the front surface of the first reducer lens 260.

The first reducer fixing protrusion 222, for example, may be disposed behind the first reducer lens 260. As another example, the first reducer fixing protrusion 222 may be disposed to contact the rear surface of the first reducer lens 260.

Each of the first reducer stopping protrusions 215d and 221 may be formed on the light emission body 210 and the light emission cover 220, respectively. A first reducer stopping protrusion 215d of the light emission body 210 and a first reducer stopping protrusion 221 of the light emission cover 220 may be disposed to be connected to each other as to form a single stopping protrusion when the light emission body 210 and the light emission cover 220 are coupled to each other.

The first reducer stopping protrusion 215d and the first reducer fixing protrusion 215e formed in the light emission body 210 may fix or constrain the first reducer lens 260 in a longitudinal direction of the light emission body 210.

The first reducer stopping protrusion 221 and the first reducer fixing protrusion 222 formed in the light emission cover 220 may fix or constrain the first reducer lens 260 in a longitudinal direction of the light emission cover 220.

Each of the first reducer fixing protrusions 215e and 222 may be formed in the light emission body 210 and the light emission cover 220, respectively. A first reducer fixing protrusion 215e of the light emission body 210 and a first reducer fixing protrusion 222 of the light emission cover 220 may be disposed to be connected to each other as to form a single protrusion when the light emission body 210 and the light emission cover 220 are coupled to each other.

The light emission body 210 may be disposed to contact the circumferential surface of the second reducer lens 270. Similarly, the light emission cover 220 may be disposed to contact the circumferential surface of the second reducer lens 270.

The light emission body 210 may further include a second reducer stopping protrusion 215f and a second reducer fixing protrusion 215g. The second reducer lens 270 may be disposed between the second reducer stopping protrusion 215f and the second reducer fixing protrusion 215g.

The second reducer stopping protrusion 215f, for example, may be disposed in front of the second reducer lens 270. As another example, the second reducer stopping protrusion 215f may be disposed to contact the front surface of the second reducer lens 270.

The second reducer fixing protrusion 215g, for example may be disposed behind the second reducer lens 270. As another example, the second reducer fixing protrusion 215g may be disposed to contact the rear surface of the second reducer lens 270.

The light emission cover 220 may further include a second reducer stopping protrusion 223 and a second reducer fixing protrusion 224, and the second reducer lens 270 may be disposed between the second reducer stopping protrusion 223 and the second reducer fixing protrusion 224.

The second reducer stopping protrusion 223 may be disposed, for example, in front of the second reducer lens 270. As another example, the second reducer stopping protrusion 223 may be disposed to contact the front surface of the second reducer lens 270.

The second reducer fixing protrusion 224 may be disposed, for example, behind the second reducer lens 270. As another example, the second reducer fixing protrusion 224 may be disposed to contact the rear surface of the second reducer lens 270.

Each of the second reducer stopping protrusion 215f and 223 may be formed in the light emission body 210 and the light emission cover 220, respectively. A second reducer stopping protrusion 215f of the light emission body 210 and a second reducer stopping protrusion 223 of the light emission cover 220 may be disposed to be connected to each other as to form a single protrusion when the light emission body 210 and the light emission cover 220 are coupled to each other.

The second reducer stopping protrusion 215f and the second reducer fixing protrusion 215g formed in the light emission body 210 may fix or constrain the second reducer lens 270 in a longitudinal direction of the light emission body 210.

The second reducer stopping protrusion 223 and the second reducer fixing protrusion 224 formed in the light emission cover 220 may fix or constrain the second reducer lens 270 in a longitudinal direction of the light emission cover 220.

Each of the second reducer fixing protrusion 215g and 224 may be formed in the light emission body 210 and the light emission cover 220, respectively. A second reducer fixing protrusion 215g of the light emission body 210 and a second reducer fixing protrusion 224 of the light emission cover 220 may be disposed to be connected to each other as to form a single protrusion when the light emission body 210 and the light emission cover 220 are coupled to each other.

Light emitted by the light source 230 may pass through the first reducer lens 260 and the second reducer lens 270. Light emitted by the second reducer lens 270 may pass through the light entrance hole 214a and then be incident on the light source lens 250.

The light entrance hole 214a may be formed, for example, in the light emission body 210. In another example, the light entrance hole 214a may be formed in the light emission cover 220. In yet another example, the light entrance hole 214a may be formed between the light emission body 210 and the light emission cover 220.

The front surface of the second reducer lens 270 may be disposed to face the rear surface of the light source lens 250 through the light entrance hole 214a.

The light emission tail part 215 may include a light source insertion hole 215b which is formed through the flange section 215a, and the light source 230 may be inserted into the light source insertion hole 215b. In some implementations, the light source insertion hole 215b penetrates the flange section 215a. The light source 230 may be disposed between the light emission body 210 and the light emission cover 220.

The light source 230 may include a light emitter 231 and a base portion 232, and the light emission tail part 215 may further include a stopping protrusion 215c formed along an inner circumferential surface of the light source insertion hole 215b. When the light source 230 is inserted into the light source insertion hole 215b, the front surface of the base portion 232 may be stopped by the stopping protrusion 215c and the rear surface of the base portion 232 may be exposed to an outside of the light emission tail part 215.

A flange section 215a which comes into contact with the dissipation module 600 may be formed in the light emission tail part 215.

Any suitable type of dissipation module 600 may be used, regardless of respective functions of each of the plurality of light function modules. Hereinafter, the dissipation module 600 will be described.

The dissipation module 600 may be disposed behind the light emission body 210 to come into contact with the flange section 215a.

The dissipation module 600 may include a heat pipe 610 in contact with at least part of the rear surface of the base portion 232.

The dissipation module 600 may be disposed in contact directly with each of a plurality of light source modules 200, and the dissipation module 600 may absorb heat of each of the plurality of light source modules 200.

The light lamp for a vehicle may be configured such that two light source modules 200 are connected to a single dissipation module 600. In this case, the dissipation module 600 may be a part of the first light function module 20 and a part of the second light function module 30.

A first light module 5 may include a first light distribution module 300, one light source module 200 connected to the first light distribution module 300, a second light distribution module 400, another light source module 200 connected to the second light distribution module 400, and a dissipation module 600 disposed to contact the two light source modules 200.

The heat pipe 610 may be disposed to contact the plurality of light sources 230. The heat pipe 610 may be disposed to contact each base portion 232 of the plurality of light sources 230.

Referring to FIG. 15, the dissipation module 600 may further include a dissipation plate 620 in contact with the heat pipe 610.

The dissipation plate 620 may include a fixing part 622 fixed to the flange section 215a, and a light source pressing part 623 pressing the heat pipe 610. The dissipation plate 620 may be disposed to contact the heat pipe 610. Heat generated by the light source 230 may be transferred to the heat pipe 610. Then, the heat transferred to the heat pipe 610 may be transferred to the dissipation plate 620.

The heat pipe 610 may be in direct contact with the flange section 215a. However, the heat pipe 610 may not be coupled directly to the flange section 215a. In some implementations, the heat pipe 610 may have a space formed therein. The heat pipe 610 may contain a fluid in the space formed therein to promote heat transfer. In such a configuration, when the heat pipe 610 and the flange section 215a are coupled to each other using a fastening member, the fluid contained in the heat pipe 610 may leak. Accordingly, the heat pipe 610 is preferably fixed to the flange section 215a using another component, without being coupled directly to the flange section 215a.

For example, the dissipation plate 620 may be coupled directly to the flange section 215a. In addition, the heat pipe 610 may be disposed between the flange section 215a and the dissipation plate 620. The dissipation plate 620 coupled to the flange section 215a may apply pressure on the heat pipe 610. The heat pipe 610 may be fixed between the flange section 215a and the light source pressing part 623.

The light function module may further include a fastening member that penetrates the flange section 215a and the fixing part 622. The dissipation plate 620 may be fixed to the flange section 215a using the fastening member.

In addition, the dissipation plate 620 may include the light source pressing part 623 that comes into contact with a part of the rear surface of the base portion 232. The light source 230 is supplied with power and emits light through the light emitter 231, and thus, the light source 230 needs to be provided with power. The light source 230 may further include a power supply unit 233 connected to the base portion 232. The power supply unit 233 may be connected to the base portion 232 and disposed behind the light emission body 210.

Thus, the heat pipe 610 may be disposed to contact a region of the base portion 232 exposed to the outside of the light emission body 210, except for a region of the base portion 232 connected to the power supply unit 233. The dissipation plate 620 may further include the light source pressing part 623 that comes into contact with a region of the base portion 232 exposed to the outside the light emission body 210, except for a region of the base portion 232 connected to the power supply unit 233 and a region of the base portion 232 contacting the heat pipe 610.

The light source pressing part 623 may absorb heat generated by the light source 230.

Referring back to FIG. 14, the front surface of the base portion 232 may be disposed to contact the stopping protrusion 215c formed in the light emission body 210, and the rear surface of the base portion 232 may come into contact with the heat pipe 610 or the dissipation plate 620. In one example, the light source 230 may be fixed between the heat pipe 610 and the stopping protrusion 215c. The light source 230 may be constrained between the heat pipe 610 and the stopping protrusion 215c in a longitudinal direction of the light emission body 210.

In another example, the light source 230 may be fixed between the dissipation plate 620 and the stopping protrusion 215c. The light source 230 may be constrained between the dissipation plate 620 and the stopping protrusion 215c in a longitudinal direction of the light emission body 210.

The dissipation module 600 may further include a dissipation fin 630 connected to the dissipation plate 620. The dissipation fin 630 may dissipate heat transferred from the dissipation plate 620 to the outside. In order to enhance efficiency of heat transfer with outdoor air, a plurality of dissipation fins 630 may be provided.

Heat generated by the light source 230 may be transferred to the dissipation plate 620 through the heat pipe 610. The heat transferred to the dissipation plate 620 may be dissipated to outdoor air through the dissipation fin 630.

In addition, the heat generated by the light source 230 may be transferred to the dissipation plate 620 through the light source pressing part 623. The heat transferred to the dissipation plate 620 may be dissipated to outdoor air through the dissipation fin 630.

Still referring to FIG. 14, the heat pipe 610 may include an extension part 611 bent toward a rearward direction away from the light emission body 210. The heat pipe 610 may come into contact with a plurality of light sources 230. Even in the case where the heat pipe 610 is not in contact with the light sources 230, the heat pipe 610 may include the elongated extension part 611 in order to improve efficiency of heat transfer. In addition, the dissipation module 600 may further include a sub-dissipation plate 640 in contact with the extension part 611. Together with the extension part 611, the sub-dissipation plate 640 may improve dissipation efficiency.

Hereinafter, the first light distribution module 300 which is to be coupled to the light source module 200 will be described.

The first light distribution module 300 may output light, emitted by the light source module 200, as a high beam.

Referring to FIGS. 11 and 14, the first light distribution module 300 may include: a first projection lens 302; and a first light distribution case 310 including a first light emission opening 306 formed at the front thereof and a first projection lens accommodating space 308.

The first projection lens 302 may be mounted in the first projection lens accommodating space 308.

The first projection lens 302 may have a convex front surface.

At least part of the front surface of the first projection lens 302 may be exposed to the outside the first light distribution case 310 through the first light emission opening 306.

The first projection lens 302 may be larger than the light source lens 250. The optical axis of the first projection lens 302 may coincide with the optical axis X of the light source lens 250.

The first projection lens 302 may include a front surface, a rear surface, and a circumferential surface. The front surface of the first projection lens 302 may be, for example, a curved surface convex toward the front of the first projection lens 302. The rear surface of the first projection lens 302 may be, for example, a flat surface. The first projection lens 302 may be symmetric with respect to the optical axis thereof.

The first light distribution module 300 may further include a first projection lens retainer 320 which is coupled to the rear surface of the first light distribution case 310 and fixes the first projection lens 302 to the first light distribution case 310.

The first light distribution case 310 may further include a first projection stopping protrusion 309 formed along a circumference of the first light emission opening 306. The first projection lens stopping protrusion 309 may be disposed to contact the front surface of the first projection lens 302. The first projection lens retainer 320 may be fixed to the first light distribution case 310 and may be disposed to contact the rear surface of the first projection lens 302. The first projection lens 302 may be disposed or fixed between the first projection lens retainer 320 and the first projection lens stopping protrusion 309.

The diffuser 290 installed in the light emission body 210 may be installed behind the first light distribution case 310. In this case, the diffuser 290 may be disposed behind the first projection lens retainer 320 of the first light distribution module 300 and may face the rear surface of the first projection lens 302.

Hereinafter, the second light distribution module 400 coupled to the light source module 200 will be described.

The second light distribution module 400 may output light emitted by the light source module 200 as a booster beam. The booster beam may partially increase a brightness of an emission area of the high beam.

The second light distribution module 400 may include: the second projection lens 402; and a second light distribution case 410 including a second light emission opening 406 formed at the front thereof and a second projection lens accommodating space 408.

The second projection lens 402 may be mounted in the second projection lens accommodating space 408.

The second projection lens 402 may have a convex front surface.

At least part of the front surface of the second projection lens 402 may be exposed to the outside of the second light distribution case 410 through the second light emission opening 406.

The second projection lens 402 may be larger than the light source lens 250. The optical axis of the second projection lens 402 may coincide with the optical axis X of the light source lens 250.

The second projection lens 402 may include a front surface, a rear surface, and a circumferential surface. The front surface of the second projection lens 402 may be, for example, a curved surface convex toward the front of the second projection lens 402. The rear surface of the second projection lens 402 may be, for example, a flat surface. The second projection lens 402 may be symmetric with respect to the optical axis of its own.

The second light distribution module 400 may further include a second projection lens retainer 420 which is coupled to the rear surface of the second light distribution case 410 and fixes the second projection lens 402 to the second light distribution case 410.

The second light distribution case 410 may further include a second projection lens stopping protrusion formed along a circumference of the second light emission opening 406. The second projection lens stopping protrusion may be disposed to contact the front surface of the second projection lens 402. The second projection lens retainer 420 may be fixed to the second light distribution case 410 and may be disposed to contact the rear surface of the second projection lens 402. The second projection lens 402 may be disposed or fixed between the second projection lens retainer 420 and the second projection lens stopping protrusion.

The diffuser 290 installed in the light emission body 210 may be installed behind the second light distribution case 410. In this case, the diffuser 290 may be disposed behind the second projection lens retainer 420 and may be disposed to face the rear surface of the second projection lens 402.

The first projection lens 302 and the second projection lens 402 may have different curvatures and different radii, and therefore, they may have different emission areas.

With reference to FIGS. 16 and 17, an optical system of a light function module including the first light distribution module 300 or the second light distribution module 400 will be described.

The following description is about an example in which the light source 230 emits blue light and the phosphor 241 converts the blue light into yellow light. In addition, while the first projection lens 302 is depicted, the same description applies when the first projection lens 302 is replaced with the second projection lens 402.

First, when the light source 230 is turned on, blue light A may be emitted by the light source 230 and then be incident on a light reducer in a direction parallel to the optical axis of the light source 230.

The light A emitted by the light source 230 in the direction parallel to the optical axis of the light source 230 may be incident on the light entrance surface of the first reducer lens 260. The light A may be refracted by the light entrance surface of the first reducer lens 260 such that the width of the light A is reduced.

The light refracted by the light entrance surface of the first reducer lens 260 may propagate through the first reducer lens 260 and exit the first reducer lens 260 through the light exit surface of the first reducer lens 260.

Light B output by the light exit surface of the first reducer lens 260 may be incident on the light entrance surface of the second reducer lens 270 in a direction parallel to the optical axis of the first reducer lens 260. Light B may be progressively reduced in width when travelling between the light exit surface of the first reducer lens 260 and the light entrance surface of the second reducer lens 270. Light B is then incident on, or received by, the light entrance surface of the second reducer lens 270.

The light incident on the light entrance surface of the second reducer lens 270 may propagate through the second reducer lens 270 and exit from the second reduce lens 270 through the light exit surface of the second reducer lens 270 in a direction parallel to the optical axis of the second reducer lens 270.

For example, while propagating through the first reducer lens 260, the air between the first reducer and the second reducer, and the second reducer lens 270 in the respective order, the light A emitted by the light source 230 may be reduced in width. Light C having a reduced width may be incident on the rear surface of the light source lens 250 in a direction parallel to the optical axis of the second reducer 270.

Light C then enters the light source lens 250 through the rear surface and becomes light D. Light D may propagate through the rear of the reflection unit 251, be incident on the rear surface of the reflection unit 251, and then be reflected from the rear surface of the reflection unit 251 toward the light source lens 250 as light E.

Light E reflected by the reflection unit 251 may be reflected in a direction toward the optical axis X of the light source lens 250 or may be refracted by the rear surface of the light source lens 250 as light F.

Light F refracted by the rear surface of the light source lens 250 may propagate from the rear surface of the light source lens 250 to the reflective phosphor 241 to be incident on the phosphor 241.

Then, a wavelength of the light F incident on the phosphor 241 may be converted by the phosphor 241, and white light may be emitted by the phosphor 241 toward the rear surface of the light source lens 250.

The light emitted by the phosphor 241 toward the rear surface of the light source lens 250 may propagate through the light source lens 250 as light G, which then may pass through the front surface of the light source lens 250 and be incident on the rear surface of a projection lens.

The light incident on the projection lens may propagate through the projection lens and then be refracted by the front surface of the projection lens thereby to be output toward the front of the projection lens in a direction parallel to the optical axis of the projection lens.

Light H output toward the front of the projection lens may be emitted toward the front of the vehicle.

Figure 18:
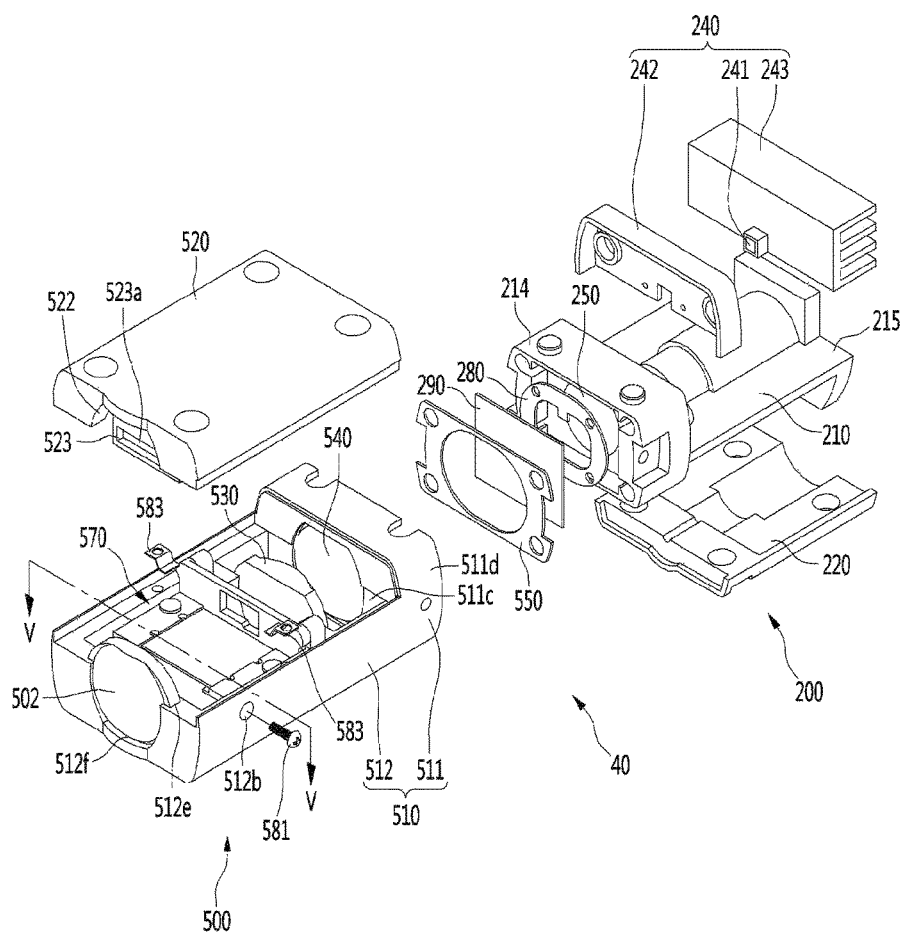
FIG. 18 is an exploded perspective view illustrating the light distribution module and the light source module shown in FIG. 9.
Figure 19:
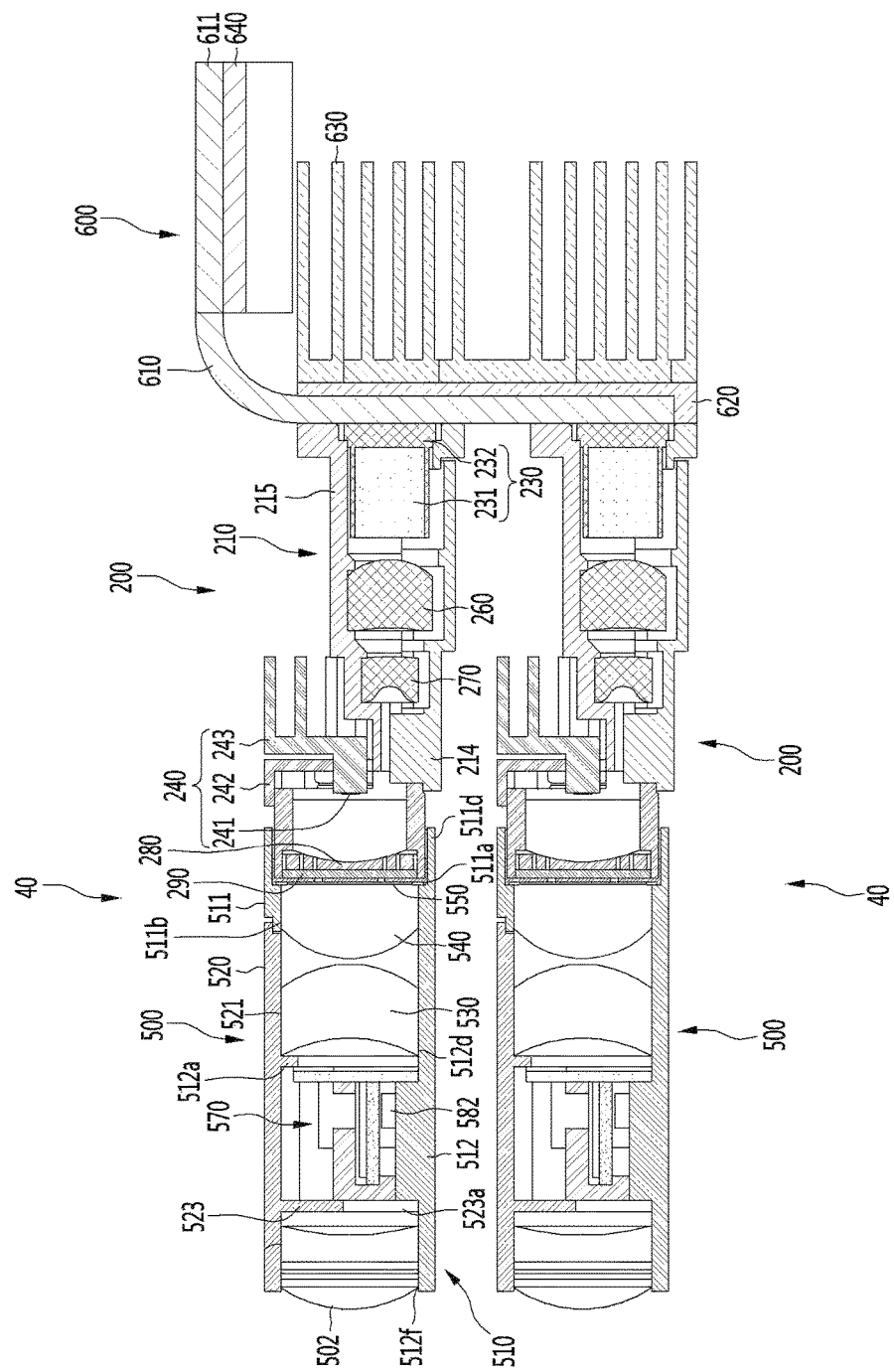
FIG. 19 is a cross-sectional view taken along line T-T of FIG. 7.
Figure 20:
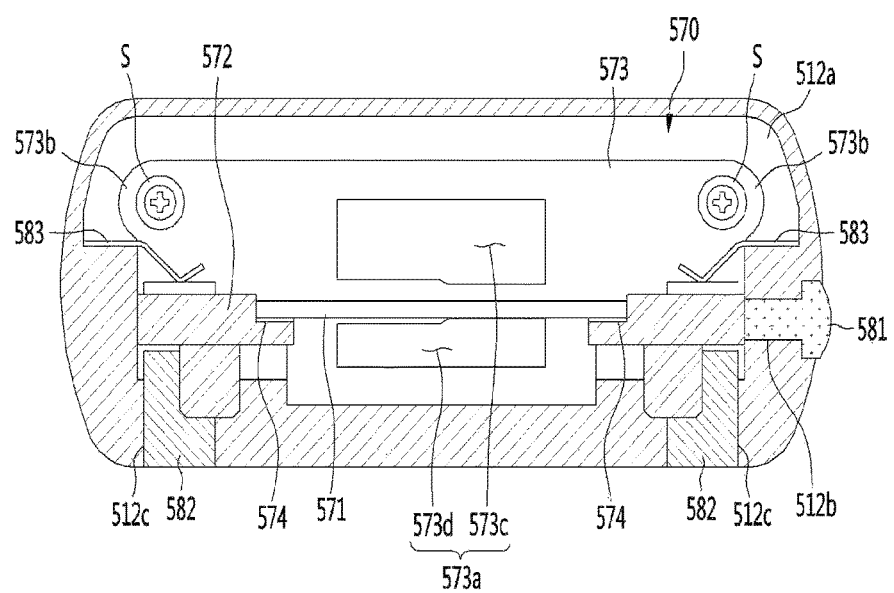
FIG. 20 is a cross-sectional view taken along line V-V of FIG. 7.
Figure 21:
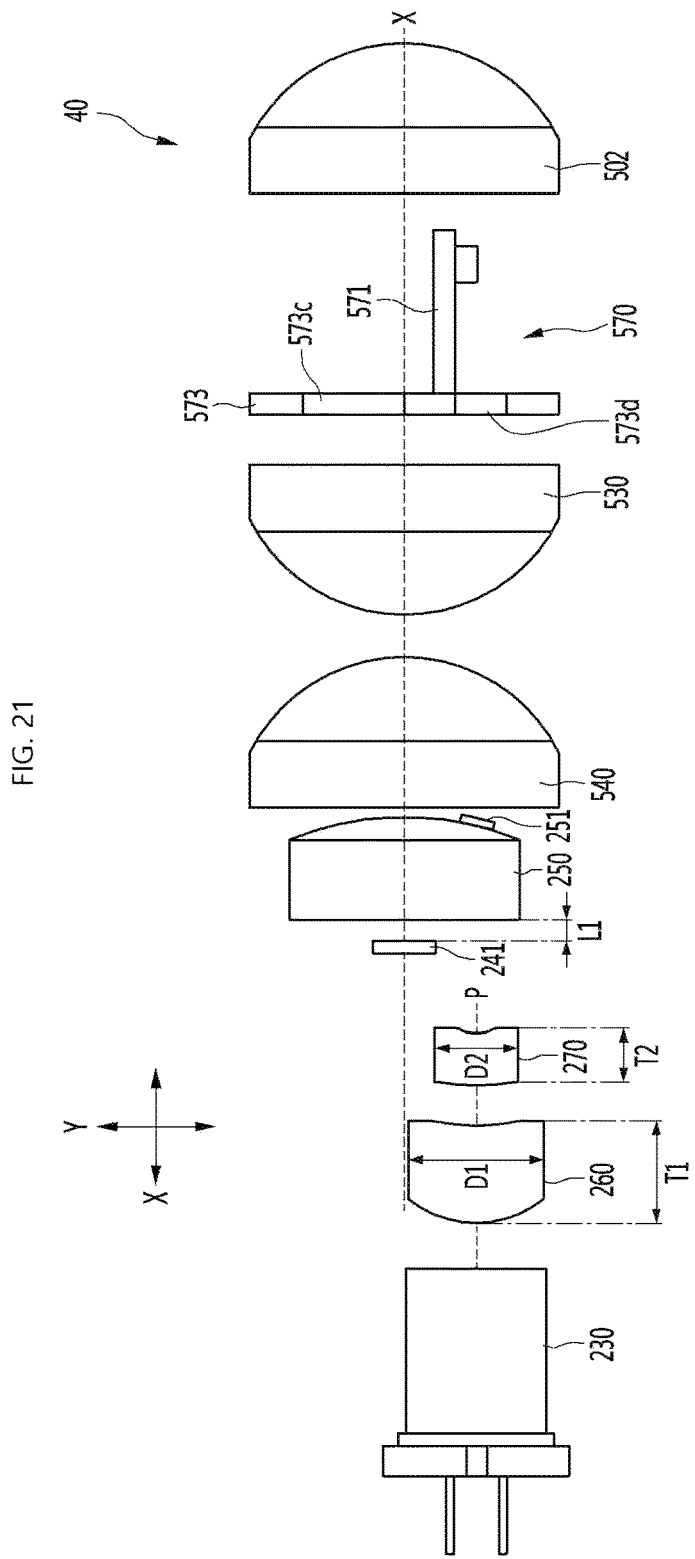
FIG. 21 is a configuration diagram of an optical system of the light distribution module and the light source module shown in FIG. 7.
Figure 22:
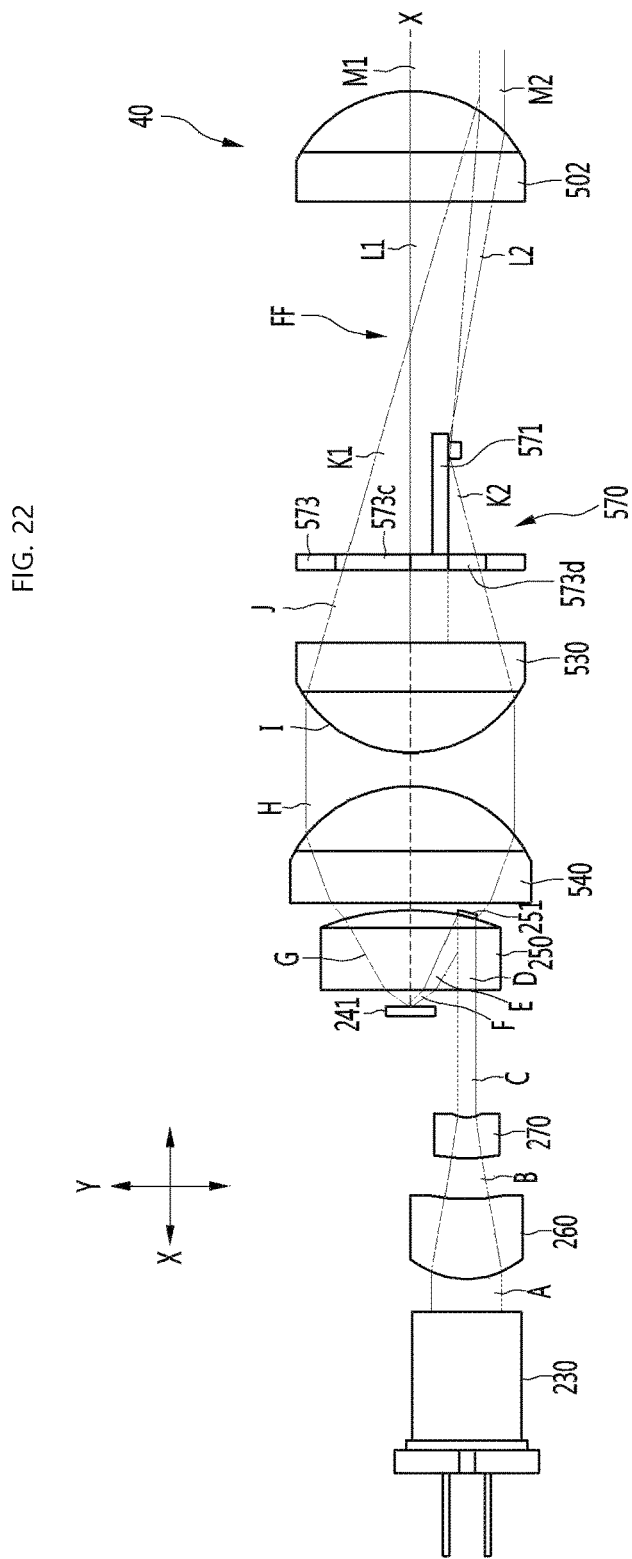
FIG. 22 is a diagram illustrating an optical path of the optical system shown in FIG. 21.

FIG. 18 illustrates an exploded perspective view of the light distribution module and the light source module shown in FIG. 9; FIG. 19 illustrates a cross-sectional view taken along line T-T of FIG. 7; FIG. 20 illustrates a cross-sectional view taken along line V-V of FIG. 7; FIG. 21 illustrates a configuration diagram of an optical system of the light distribution module and the light source module shown in FIG. 7; and FIG. 22 illustrates a diagram of an optical path of the optical system shown in FIG. 21;

Referring to FIGS. 18 and 19, a third light function module 40 out of a plurality of light function modules may include a third light distribution module 500, a light source module 200, and a dissipation module 600.

The third light distribution module 500 may include, for example, a third projection lens 502, a light distribution case 510, a light distribution cover 520, a focusing lens 530, and a shield retainer assembly 570. As another example, the third light distribution module 500 may further include a collimator lens 540 and a collimator lens retainer 550.

The collimator lens 540, the focusing lens 530, a third projection lens 502, and the shield retainer assembly 570 may be accommodated in the light distribution case 510. The light distribution cover 520 may be disposed to cover the light distribution case 510.

The collimator lens 540 may output light incident on the rear surface thereof in a form of parallel light, or collimated light. The parallel light may be parallel to the optical axis of the collimator lens 540.

The rear surface of the collimator lens 540 may be, for example, a flat surface or a curved surface that is concave toward the front of the collimator lens 540. As another example, a part of the rear surface of the collimator lens 540 may be a flat surface and the rest of the rear surface may be a curved surface that is concave toward the front of the collimator lens 540.

The collimator lens 540 may be disposed such that the front surface thereof faces the rear surface of the focusing lens 530.

Light incident on the rear surface of the collimator lens 540 may be light output by the light source lens 250. The light output by the light source lens 250 may be non-parallel light, such as scattered light.

The light distribution case 510 may include a light distribution head part 511 and a light distribution tail part 512. The light distribution head part 511 may include a collimator lens insertion hole 511*a* formed at the rear thereof and a collimator lens accommodating space 511*b*. The light distribution tail part 512 may be connected to the front of the light distribution head part 511. The collimator lens 540 may be mounted in the collimator lens accommodating space 511*b*.

The focusing lens 530 may have, for example, a convex rear surface, and the collimator lens 540 may have, for example, a convex front surface. The optical axis of the focusing lens 530 and the optical axis of the collimator lens 540 may coincide with each other.

Parallel light formed by the collimator lens 540 may be parallel to the optical axis X of the collimator lens 540. In addition, the parallel light may be parallel to the optical axis of the focusing lens 530.

The light distribution cover 520 may cover the light distribution tail part 512. The light distribution tail part 512 may accommodate the focusing lens 530, the shield retainer assembly 570, and the third projection lens 502.

The length of the light distribution cover 520 may be longer than a distance between the third projection lens 502 and the focusing lens 530.

The focusing lens 530 may be disposed in front of the collimator lens 540, and the front surface of the collimator lens 540 and the rear surface of the focusing lens 530 may be disposed to face each other.

The third light distribution module 500 may further include a collimator lens retainer 550 which is coupled to the rear surface of the light distribution head part 511 and fixes the collimator lens 540 to the light distribution head part 511. The collimator lens retainer 550 may come into contact with the rear surface of the collimator lens 540. The collimator lens retainer 550 may press the rear surface of the collimator lens 540.

The light distribution head part 511 may further include a collimator lens stopping protrusion 511*c* formed along an inner circumferential surface of the collimator lens insertion hole 511*a*. The collimator lens stopping protrusion 511*c* may be disposed in front of the collimator lens 540. The collimator lens stopping protrusion 511*c* may come into contact with the front surface of the collimator lens 540. The collimator lens stopping protrusion 511*c* may press the front surface of the collimator lens 540.

The collimator lens retainer 550 may include a mounting part fixed to the light distribution head part 511, and a pressing part pressing the collimator lens 540. The collimator lens 540 may be disposed between the collimator lens stopping protrusion 511*c* and the collimator lens retainer 550. For example, the collimator lens 540 may be fixed between the collimator lens stopping protrusion 511*c* and the collimator lens 540. As another example, the collimator lens 540 may be constrained between the collimator lens stopping protrusion 511*c* and the collimator lens 540 in a longitudinal direction of the light distribution case 510.

The third light distribution module 500 may further include a fastening member penetrating the mounting part and fixed to the rear surface of the light distribution head part 511.

The light distribution head part 511 may include an insertion part 511*d* that protrudes from the periphery of the collimator lens retainer 550 to the rear of the light distribution case 510. The third light distribution module 500 may be coupled to the light source module 200, and a part of the front of the light source module 200 may be inserted into the rear of the third light distribution module 500. The front of the light source module 200 may be inserted into the insertion part 511*d* of the light distribution case 510.

The third light distribution module 500 may further include a diffuser 290 which is disposed behind the collimator lens retainer 550 and faces the rear surface of the collimator lens 540. The diffuser 290 may be disposed in the light source module 200 or the third light distribution module 500.

The focusing lens 530 may include a front surface, a rear surface, and a circumferential surface. The front surface of the focusing lens 530 may be, for example, a flat surface. The rear surface of the focusing lens 530 may be, for example, a curved surface convex toward the rear of the focusing lens 530. The focusing lens 530 may be symmetric with respect to the optical axis thereof.

The focusing lens 530 may concentrate light incident on, or received at, the rear surface and output the concentrated light. The focusing lens 530 may concentrate light incident on the rear surface thereby to form an image forming plane. The image forming plane of the focusing lens 530 may be formed in front of the focusing lens 530.

The image forming plane formed by the focusing lens 530 may be a plane where an optical image is formed. If a screen is located at the image forming plane, an image may be formed on the screen.

Referring to FIG. 22, by concentrating light incident on the rear surface, the focusing lens 530 may form a focus FF. A focus FF corresponds to a point at which parallel rays of light incident on the rear surface of the focusing lens 530 converge. The focus FF of the focusing lens 530 may be formed on the front side of the focusing lens 530.

The front surface of the focusing lens 530 may be, for example, a flat surface or a curved surface concave toward the rear of the focusing lens 530. As another example, a part of the front surface of the focusing lens 530 may be a curved surface that is concave toward the rear of the focusing lens 530.

The focusing lens 530 may be disposed between the light distribution case 510 and the light distribution cover 520 and disposed in front of the collimator lens 540.

The light distribution case 510 may further include a focusing lens mounting groove 512*d*. The focusing lens 530 may be mounted in the focusing lens mounting groove 512*d*. The focusing lens mounting groove 512*d* may be disposed to contact the front surface and the rear surface of the focusing lens 530. When mounted in the focusing lens mounting groove 512*d*, the focusing lens 530 may be constrained in a longitudinal direction of the light distribution case 510.

The light distribution cover 520 may further include a focusing lens mounting groove 521. The focusing lens 530 may be mounted in the focusing lens mounting groove 521. The focusing lens mounting groove 521 may be disposed to contact the front surface and the rear surface of the focusing lens 530. When mounted on the focusing lens mounting groove 521, the focusing lens 530 may be constrained in a longitudinal direction of the light distribution cover 520.

Referring to FIG. 20, the shield retainer assembly 570 may include a shield 573, a mirror 571, and a mirror mounting part 572. The shield retainer assembly 570 may be disposed in front of the focusing lens 530. The front surface of the focusing lens 530 may be disposed to face the shield 573. The shield 573 may be, for example, disposed parallel to the front surface of the focusing lens 530. As another example, the shield 573 may be disposed parallel to the rear surface of the collimator lens 540. As yet another example, the shield 573 may be disposed perpendicular to the optical axis of the focusing lens 530.

The shield 573 may shield a part of light passing through the image forming plane of the focusing lens 530. The shield 573 may include an opening 573*a*. A plurality of openings 573*a* may be formed in the shield 573. For example, the shield 573 may include an upper opening 573*c* formed above the optical axis of the focusing lens 530, and in addition, the shield 573 may include a lower opening 573*d* formed below the optical axis of the focusing lens 530.

The shield 573 may allow a part of light emitted by the focusing lens 530 to pass through the opening 573*a*, and shield, or block, the rest of the light. The opening 573*a* formed in the shield 573 may form a cut-off line. Light distribution pattern achieved by the third light distribution module 500 may be adjusted according to the shape of the cut-off line of the opening 573*a*. When the third light distribution module 500 is used to generate a low beam, the cut-off line of the opening 573*a* may be adjusted to achieve a light distribution pattern required for the low beam.

As such, a pattern of light passing through the image forming plane may be changed according to a shape of the shield 573. Accordingly, it is possible to achieve various light distribution patterns by changing the shape of the shield 573.

The collimator lens retainer 550 may include a light through hole. Light emitted by the light source module 200 may pass through the light through hole and then be incident on the rear surface of the collimator lens 540.

In the case where the shield 573 include a single opening, the width of the light through hole may be larger than the width of the single opening. Light incident on the rear surface of the collimator lens 540 may be output in a form of parallel light, and the parallel light may be incident on the rear surface of the focusing lens 530. As the focusing lens 530 causes rays of light converge, the opening included in the shield 573 disposed in front of the focusing lens 530 may be smaller than the width of the light through hole.

In addition, in the case where the shield 573 has a single opening, the height of the light through hole may be greater than the width of the single opening. Light incident on the rear surface of the collimator lens 540 may be output in a form of parallel light, and the parallel light may be incident on the rear surface of the focusing lens 530. As the focusing lens 530 is configured to concentrate light, the opening included in the shield 573 disposed in front of the focusing lens 530 may be smaller than the height of the light through hole.

In addition, in the case where the shield 573 includes a plurality of openings, the width of the light through hole may be greater than the maximum width of each of the openings. Light incident on the rear surface of the collimator lens 540 may be output in a form of parallel light, and the parallel light may be incident on the rear surface of the focusing lens 530. As the focusing lens 530 is configured to concentrate light, a width of each of the openings included in the shield 573 disposed in front of the focusing lens 530 may be smaller than the width of the light through hole.

In addition, in the case where the shield 573 includes a plurality of openings, the height of the light through hole may be greater than a sum of the heights of the openings. Light incident on the rear surface of the collimator lens 540 may be output in a form of parallel light, and the parallel light may be incident on the rear surface of the focusing lens 530. As the focusing lens 530 is configured to concentrate rays of light, the sum of the heights of the openings included in the shield 573 disposed in front of the focusing lens 530 may be smaller than the height of the light through hole.

In the case where the shield 573 includes a single opening, the width of the focusing lens 530 may be greater than the width of the opening. Light incident on the rear surface of the collimator lens 540 may be output in a form of parallel light, and the parallel light may be incident on the rear surface of the focusing lens 530. As the focusing lens 530 is configured to concentrate rays of light, the opening included in the shield 573 disposed in front of the focusing lens 530 may be smaller than the width of the focusing lens 530.

In addition, in the case where the shield 573 includes a single opening, the height of the focusing lens 530 may be greater than the width of the opening. Light incident on the rear surface of the collimator lens 540 may be output in a form of parallel light, and the parallel light may be incident on the rear surface of the focusing lens 530. As the focusing lens 530 is configured to concentrate rays of light, the opening included in the shield 573 disposed in front of the focusing lens 530 may be smaller than the height of the focusing lens 530.

In addition, in the case where the shield 573 includes a plurality of openings, the width of the focusing lens 530 may be greater than the maximum width of each of the openings. Light incident on the rear surface of the collimator lens 540 may be output in a form of parallel light, and the parallel light may be incident on the rear surface of the focusing lens 530. As the focusing lens 530 is configured to concentrate rays of light, the width of each of the openings included in the shield 573 disposed in front of the focusing lens 530 may be smaller than the width of the focusing lens 530.

In addition, in the case where the shield 573 includes a plurality of openings, the height of the focusing lens 530 may be greater than a sum of the heights of the openings. Light incident on the rear surface of the collimator lens 540 may be output in a form of parallel light, and the parallel light may be incident on the rear surface of the focusing lens 530. As the focusing lens 530 is configured to concentrate rays of light, the sum of the heights of the openings included in the shield 573 disposed in front of the focusing lens 530 may be smaller than the width of the focusing lens 530.

The shield 573 may be disposed to face a lower portion of the front surface of the focusing lens 530. The focusing lens 530 may be divided along its optical axis into an upper portion and a lower portion. The upper portion is a portion above the optical axis, and the lower portion is a portion below the optical axis.

The shield 573 may be a member including a flat surface, and the front surface of the focusing lens 530 may be a flat surface. The fact that the shield 573 is disposed to face the front surface of the focusing lens 530 may mean that the flat surface of the shield 573 and the front surface of the focusing lens 530 can be disposed parallel to each other.

Accordingly, the shield 573 may be disposed parallel to the front surface of the focusing lens 530 and face a portion of the focusing lens 530 below the optical axis of the focusing lens 530.

By disposing the shield 573 to face the lower portion of the front surface of the focusing lens 530, the third light distribution module 500 may generate a low beam.

The image forming plane of the focusing lens 530 may be formed at a predetermined distance from the front surface of the focusing lens 530. As the focusing lens 530 is configured to concentrate rays of light, the size of light passing through the focusing lens 530 may be reduced relative to the size of light incident on the rear surface of the focusing lens 530.

Accordingly, the shield 573 may be smaller than the focusing lens 530. For example, the shield 573 may be smaller than the front surface of the focusing lens 530.

The shield retainer assembly 570 may include the mirror 571, the mirror mounting part 572 on which the mirror 571 is mounted, and the shield 573 having at least one opening formed therein. The mirror mounting part 572 and the shield 573 may be angled, for example orthogonal, to each other.

The mirror mounting part 572 may be connected to the shield 573. In some implementations, the mirror mounting part 572 may be disposed at an angle, e.g., orthogonal, to the shield 573. In the case where an upper opening 573*c* and a lower opening 573*d* are formed in the shield 573, the mirror mounting part 572 may be connected between the upper opening 573*c* and the lower opening 573*d*.

The mirror 571 may be mounted on the mirror mounting part 572. The mirror 571 may include a reflective surface. The reflective surface may be, for example, disposed to face the bottom of the light distribution case 510.

The shield retainer assembly 570 may further include an adhesive member 574. The adhesive member 574 may be disposed between the mirror mounting part 572 and the mirror 571. The mirror 571 may be fixed to or mounted on the mirror mounting part 572 using the adhesive member 574. A groove in which the adhesive member 574 is to be disposed may be formed in the mirror mounting part 572. The adhesive member 574 may be disposed between the reflective surface of the mirror 571 and the mirror mounting part 572.

The mirror 571 may be disposed parallel to the optical axis of the focusing lens 530.

In the case where the front surface of the focusing lens 530 is a flat surface, the mirror 571 may be disposed perpendicular to the front surface of the focusing lens 530.

The mirror 571 may include a reflective surface that reflects light passing through an image forming plane formed by the focusing lens 530.

The mirror 571 may be disposed to reflect light passing through the lower opening 573d of the shield 573.

The reflective surface of the mirror 571 may be disposed at a predetermined distance from the optical axis of the focusing lens 530.

The mirror 571 may be disposed parallel to the optical axis of the third projection lens 502.

In the case where the rear surface of the third projection lens 502 is a flat surface, the mirror 571 may be disposed perpendicular to the rear surface of the third projection lens 502.

The reflective surface of the mirror 571 may be disposed at a predetermined distance from the third projection lens 502.

The mirror 571 may be disposed to reflect light passing through the lower opening 573d of the shield 573, and the light reflected by the mirror 571 may be incident on the rear surface of the third projection lens 502. The light reflected by the mirror 571 may be incident on a portion of the third projection lens 502 below the optical axis of the third projection lens 502.

Light passing through the upper opening 573c of the shield 573 may be incident on a portion of the third projection lens 502 below the optical axis of the third projection lens 502.

The light incident on the portion of the third projection lens 502 below the optical axis of the third projection lens 502 may be output as a low beam.

An overall brightness of the low beam may be a combination of the brightness of light passing through the upper opening 573c of the shield 573 and the brightness of light reflected by the mirror 571.

The focusing lens 530 may form a focus on the front thereof. The focus FF formed by the focusing lens 530 may be, for example, positioned between the third projection lens 502 and the focusing lens 530.

In the case where the focus FF formed by the focusing lens 530 is positioned before the rear surface of the third projection lens 502, the light passing through the upper opening 573c of the shield 573 may be incident on a portion of the third projection lens 502 above the optical axis of the third projection lens 502. The light incident on the portion of the third projection lens 502 above the optical axis of the third projection lens 502 may be output above the optical axis of the third projection lens 502. When the light is output above the optical axis of the third projection lens 502, the resulting beam of light may not be a low beam.

Accordingly, in order to generate a low beam, the third projection lens 502 is preferably disposed to position the focus FF formed by the focusing lens 530 between the focusing lens 530 and the third projection lens 502.

The focusing lens 530, the shield 573, the mirror 571, and the third projection lens 502 may be arrange in the respective order along a direction of propagation of light incident on the rear surface of the focusing lens 530.

The shield retainer assembly 570 may be disposed between the light distribution case 510 and the light distribution cover 520 and disposed in front of the focusing lens 530.

The light distribution case 510 may further include a mounting part 512a protruding from an inner surface of the light distribution case. The shield 573 may further include a fixing part 573b spaced apart from an opening of the shield 573. The fixing part 573b may be fixed to the mounting part 512a.

The shield retainer assembly 570 may be disposed in front of the focusing lens 530. Accordingly, the mounting part 512a may be disposed in front of the focusing lens 530. In addition, the mounting part 512a may be disposed behind the third projection lens 502. Furthermore, the mounting part 512a may be disposed between the third projection lens 502 and the focusing lens 530.

The third light distribution module 500 may further include a coupling member s penetrating the mounting part 512a and the fixing part 573b. The shield retainer assembly 570 may be fixed to the light distribution case 510 using the coupling member S.

The coupling member S may be disposed such that a longitudinal direction of the coupling member S is parallel to a longitudinal direction of the light distribution case 510.

In this case, a light distribution pattern formed by the third light distribution module 500 may be changed according to an angular orientation and a location of the shield retainer assembly 570 when fixed to the light distribution case 510. Accordingly, to achieve a desired light distribution pattern, a structure which enables fine adjustments of a location and angular orientation of the shield retainer assembly 570 is required.

The shield retainer assembly 570 may be formed from an elastic material. This may, for example, enable fine adjustments. In another example, the shield retainer assembly 570 may be formed from a flexible material.

The light distribution module 500 may further include a side-surface hole 512b formed on one side surface of the light distribution case 510, and a horizontally moving coupler, such as horizontally moving screw 581, that is inserted into the side-surface hole 512b. The horizontally moving screw 581 may horizontally move along the side-surface hole 512b, for example, by rotating the horizontally moving screw 581.

The horizontally moving screw 581 may press one side surface of the mirror mounting part 572 in a horizontal direction. The position of the shield retainer assembly 570 may be adjusted according to the movement of the horizontally moving screw 581. In general, any suitable horizontally moving coupler may be implemented.

In addition, the light distribution module 500 may further include a bottom-surface hole 512c formed in the bottom surface of the light distribution case 510, and a vertically moving coupler, such as vertically moving screw 582, that is inserted into the bottom-surface hole 512c. The vertically moving screw 582 may vertically move along the bottom-surface hole 512c, for example, by rotating the vertically moving screw 582.

The vertically moving screw 582 may press the bottom surface of the mirror mounting part 572 in a vertical direction. The position of the shield retainer assembly 570 may be adjusted according to the movement of the vertically moving screw 582. In general, any suitable vertically moving coupler may be implemented.

The light distribution module 500 may further include a support clip 583 fixed to the inner side surface of the light distribution case 510. The support clip 583 may press the top surface of the mirror mounting part 572 in a downward direction.

The third light distribution module 500 may further include the third projection lens 502. The third projection lens 502 may include a front surface, a rear surface, and a circumferential surface. The front surface of the third projection lens 502 may be, for example, a curved surface convex toward the front of the third projection lens 502. The rear surface of the third projection lens 502 may be, for example, a flat surface. The third projection lens 502 may be symmetric with respect to the optical axis thereof.

The optical axis of the third projection lens 502 may coincide with the optical axis of the focusing lens 530. In another example, the third projection lens 502 may coincide with the optical axis of the collimator lens 540.

The rear surface of the third projection lens 502 may be, for example, a flat surface or a curved surface concave toward the front of the third projection lens 502. As another example, a part of the rear surface of the third projection lens 502 may be a flat surface and the rest of the rear surface may be a curved surface concave toward the front of the third projection lens 502.

The rear surface of the third projection lens 502 may be, for example, parallel to the front surface of the focusing lens 530. As another example, the rear surface of the third projection lens 502 may be parallel to the rear surface of the collimator lens 540.

The shield 573 may be disposed to face the lower portion of the rear surface of the third projection lens 502. The third projection lens 502 may be divided along its optical axis into an upper portion and a lower portion. The upper portion may be a portion above the optical axis, and the lower portion may be a portion below the optical axis.

The shield 573 may be a member including a flat surface, and the rear surface of the third projection lens 502 may be a flat surface. In this case, the fact that the shield 573 is disposed to face the rear surface of the third projection lens 502 may indicate that the flat surface of the shield 573 and the rear surface of the third projection lens 502 are able to be disposed parallel to each other.

Accordingly, the shield 573 may be disposed parallel to the rear surface of the third projection lens 502 and face an area of the third projection lens 502 below the optical axis thereof.

The third projection lens 502 may be disposed to position the image forming plane of the focusing lens 530 between the third projection lens 502 and the focusing lens 530.

The shield retainer assembly 570 may be, for example, disposed at the image forming plane. As another example, the shield 573 may be disposed at the image forming plane.

The focus FF of the focusing lens 530 may be formed on the front side of the focusing lens 530. The third projection lens 502 can then be disposed such that the focus FF of the focusing lens 530 is positioned between the third projection lens 502 and the focusing lens 530.

The third light distribution module 500 may be configured such that the collimator lens 540, the focusing lens 530, the shield 573, and the projection lens 502 are arranged in the respective order along the X-axis.

The light distribution module 500 may further include a third projection lens 502, and the third projection lens 502 may be disposed between the light distribution case 510 and the light distribution cover 520 and disposed in front of the shield retainer assembly 570.

Referring to FIG. 18, the light distribution cover 520 may include a cover shield 523 connected thereto in a downward direction. The cover shield 523 may be disposed between the third projection lens 502 and the shield retainer assembly 570. The cover shield 523 may be disposed to face the rear surface of the third projection lens 502.

The cover shield 523 may prevent light from being emitted in a pattern other than a light distribution pattern formed by the third light distribution module 500. Accordingly, the cover shield 523 may include at least one opening 523a. The cover shield 523 may be formed in a different shape according to the cut-off line of the opening 523a formed in the shield 573 or the number of openings 573a formed in the shield 573.

The light distribution case 510 may further include a third projection lens mounting groove 512e. The third projection lens 502 may be mounted in the projection lens mounting groove 512e. The third projection lens mounting groove 512e may be disposed to contact the front surface and the rear surface of the third projection lens 502. When mounted in the third projection lens mounting groove 512e, the third projection lens 502 may be constrained in a longitudinal direction of the light distribution case 510.

The light distribution cover 520 may further include a third projection lens mounting groove 522. The third projection lens 502 may be mounted in the third projection lens mounting groove 522. The third projection lens mounting groove 522 may be disposed to contact the front surface and the rear surface of the third projection lens 502. When mounted in the third projection lens mounting groove 522, the third projection lens 502 may be constrained in a longitudinal direction of the light distribution cover 520.

The light distribution module 500 may include a light emission opening 512f. The light emission opening 512f may be formed by coupling the light distribution tail part 512 and the light distribution cover 520. At least part of the front surface of the third projection lens 502 may be exposed to the outside of the light distribution case 510 through the light emission opening 512f.

The second light module 6 may include two third light distribution modules 500, two light source modules 200, and one dissipation module 600 connected to the two light source modules 200.

Referring to FIGS. 21 and 22, an optical system of a light function module including a third light distribution module 500 will be described.

The following description is about an example in which the light source 230 emits blue light and the phosphor 241 converts the blue light into yellow light.

First, when the light source is turned on 230, the light source 230 may emit blue light A and the light A emitted by the light source 230 may be incident on a light reducer in a direction parallel to the optical axis of the light source 230.

The light A emitted by the light source 230 in the direction parallel to the optical axis of the light source 230 may be incident on a light entrance surface of the first reducer lens 260 and then be refracted by the light entrance surface of the first reducer lens 260 such that the width of the light A is reduced.

The light refracted by the light entrance surface of the first reducer lens 260 may pass through the first reducer lens 260 and then be emitted from a light exit surface of the first reducer lens 260.

Light B output by the light exit surface of the first reducer lens 260 may be incident on a light entrance surface of the second reducer lens 270 in a direction parallel of the optical axis of the first reducer lens 260. Light B may be progressively reduced in width when passing between the light exit surface of the first reducer lens 260 and the light entrance surface of the second reducer lens 270. Light B is then incident on, or received by, the light entrance surface of the second reducer lens 270.

The light incident on the light entrance surface of the second reducer lens 270 may propagate through the second reducer lens 270 and exit from the second reduce lens 270 through the light exit surface of the second reducer lens 270 in a direction parallel to the optical axis of the second reducer lens 270.

As such, in some implementations, the light A emitted by the light source 230 may be reduced in width when passing through the first reducer lens 260, the air between the first reducer and the second reducer, and the second reducer lens 270 in the respective order. Light C having reduced width may be incident on a rear surface of the light source lens 250 in a direction parallel to the optical axis of the second reducer lens 270.

Light C incident on the rear surface of the light source lens 250 may pass through the rear of the reflection unit 251 to become light D, and then be incident on the rear surface of the reflection unit 251, or may be reflected from the rear surface of the reflection unit 251 as light E.

Light E reflected by the reflection unit 251 may be reflected in a direction toward the optical axis X of the light source lens 250 or may be refracted by the rear surface of the light source lens 250 as light F.

Light F refracted by the rear surface of the light source lens 250 may propagate from the rear surface of the light source lens 250 to the reflective phosphor 241 to be incident on the phosphor 241.

Then, a wavelength of the light F incident on the phosphor 241 may be converted by the phosphor 241, and white light may be emitted by the phosphor 241 toward the rear surface of the light source lens 250.

The light emitted by the phosphor 241 toward the rear surface of the light source lens 250 may propagate through the light source lens 250 as light G, which then may pass through the front surface of the light source lens 250 and then be incident on a collimator lens 540 through the rear surface of the collimator lens 540.

The light incident on the collimator lens 540 may propagate through the collimator lens 540 and then be refracted by the front surface of the collimator lens 540 and output toward the front side of the collimator lens in a direction parallel to the optical axis of the collimator lens 540 as light H.

Light H output toward the front of the collimator lens 540 may be parallel light.

The light H may then be incident on the focusing lens 530 through the rear surface of the focusing lens 530 as light I.

Light I incident on the focusing lens 530 may be refracted by the rear surface of the focusing lens 530 and propagates through the focusing lens 530. At this point, the light I may be converging due to the refraction by the rear surface of the focusing lens 530. Light I then exits the focusing lens 530 through the front surface of the focusing lens 530 to be output toward the front side of the focusing lens 530 as light J.

Light J output toward the front side of the focusing lens 530 may pass through the image forming plane and the focus FF. A part of the light J output toward the front of the focusing lens 530 may be shielded by the shield 573 disposed at the image forming plane.

A part of the light J output toward the front side of the focusing lens 530 may be light K1 passing through the upper opening 573c formed on the shield 573.

The rest of the light J output toward the front side of the focusing lens 530 may be light K2 passing through the lower opening 573d formed in the shield 573.

The light K1 may converge at one point when passing through the focus FF, and then be incident on a portion of the focusing lens 530 below the optical axis of the focusing lens 530 as light L1.

Light L1 passing through the upper opening 573c and then the focus FF of the focusing lens 530 may be incident on the third projection lens 502 through the rear surface of the third projection lens 502.

The light incident on the third projection lens 502 may pass through the third projection lens 502 and then be refracted by the front surface of the third projection lens 502 to be output toward the front side of the third projection lens 502 in a direction parallel to the optical axis of the third projection lens 502.

Light M1 output toward the front of the third projection lens 502 may be a low beam. In addition, the light M1 emitted toward the front of the third projection lens 502 may be parallel light.

The light K2 passing through the lower opening 573d may be incident on the mirror 571. The mirror 571 may reflect the light K2 toward the third projection lens 502 as light L2.

Light L2 reflected by the mirror 571 may be incident on the third projection lens 502 without passing through the focus FF of the focusing lens 530.

The light incident on the third projection lens 502 may propagate through the third projection lens 502 and then be refracted by the front surface of the third projection lens 502 to be output toward the front side of the third projection lens 502 in a direction parallel to the optical axis of the third projection lens 502.

Light M2 emitted toward the front side of the third projection lens 502 may be a low beam. In addition, the light M2 emitted toward the front of the third projection lens 502 may be parallel light.

The light M1 passing through the upper opening 573c of the shield 573 and output toward the front side of the third projection lens 502 may overlap the light M2 passing through the lower opening 573d of the shield 573 and output toward the front side of the third projection lens 502. As a result, an amount of light emitted through the third projection lens 502 may be increased.

Now turning to various arrangements of the plurality of light function modules, a plurality of light function modules 20, 30, and 40 may be arranged in various ways with respect to one another. According to an implementation of the present disclosure, the first light function module 20 and the second light function module 30 may be arranged vertically above or below each other. The first light function module 20 and the third light function module 40 may be spaced apart from each other in a horizontal direction.

A dissipation module 600 of the first light function module 20 may include a heat pipe 610 disposed to contact a light source 230 of the first light function module 20. The heat pipe 610 disposed to contact the first light function module 20 may be disposed to contact either or both the light source 230 of the second light function module 30 and a light source 230 of the third light function module 40.

The dissipation module 600 of the first light function module 20 may include a dissipation plate 620 disposed to contact the light source 230 of the first light function module 20, and the dissipation plate 620 may be disposed to contact either or both the light source 230 of the second light function module 30 and the light source 230 of the third light function module 40.

Hereinafter, configurations and effects different from the above implementations will be described with respect to their differences from the previously described implementations.

Figure 23:
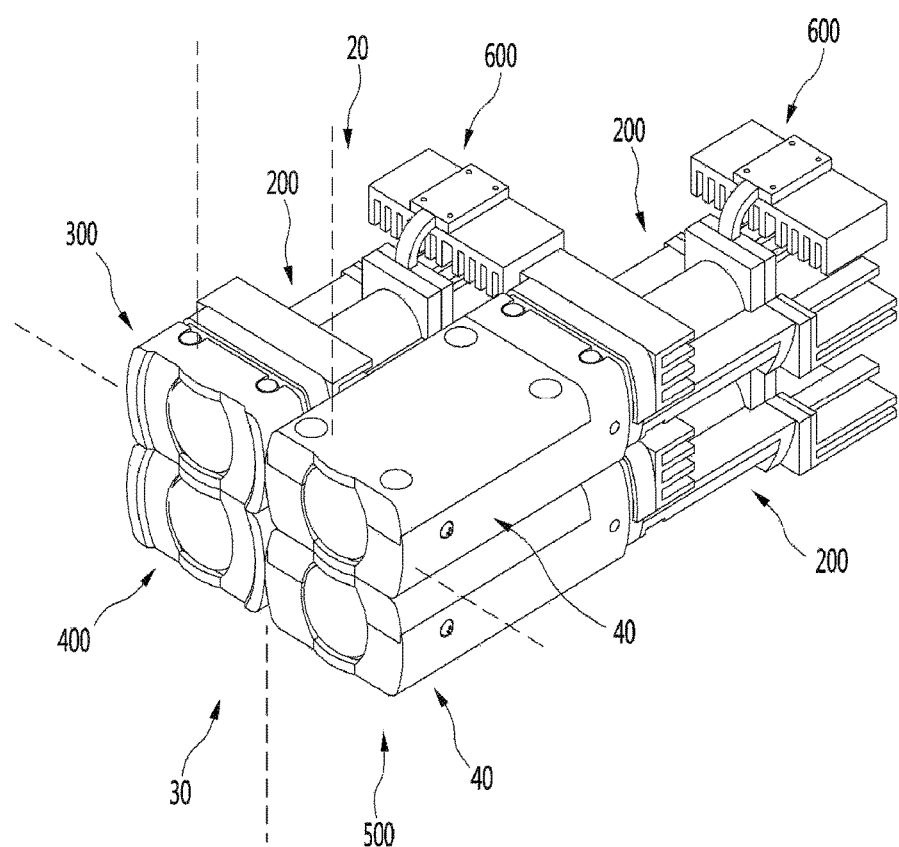
FIG. 23 is a perspective view illustrating an example of an arrangement of light function modules according to some implementations of the present disclosure.

FIG. 23 illustrates a perspective view of an example of an arrangement of light function modules according to some implementations of the present disclosure.

Referring to FIG. 23, the light lamp for a vehicle may include a plurality of light function modules 20, 30, and 40. In some implementations, the light function modules 20, 30, and 40 may be arrange or stacked in a vertical direction. While vertical stacking of two modules is shown, additional modules may be stacked in the vertical direction.

Figure 24:
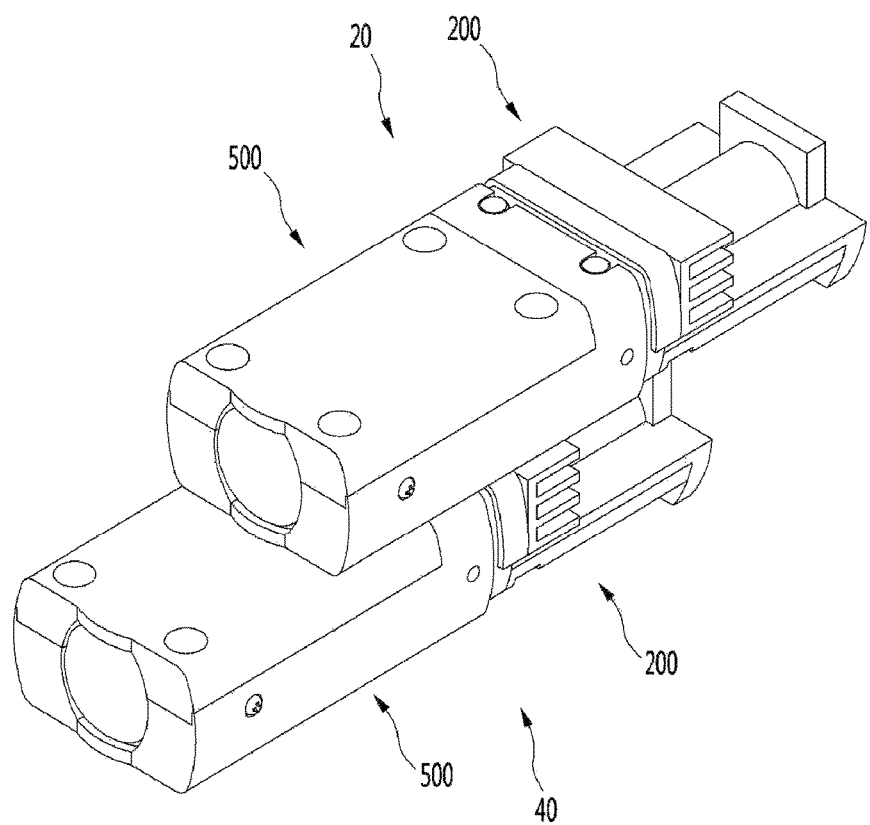
FIG. 24 is a perspective view illustrating an example of an arrangement of light function modules according to some implementations of the present disclosure.

FIG. 24 illustrates a perspective view of an example of an arrangement of light function modules according to some implementations of the present disclosure.

Referring to FIG. 24, the light lamp for a vehicle may include a plurality of light function modules 40 arranged or stacked in a vertical direction. In some implementations, one of the light function modules 40 may be fixed to another light function module 40. In some implementations, one of the light function modules 40 may be in contact with another light function module 40 but not fixed thereto. In some implementations, one of the light function modules 40 may be guided along a longitudinal direction of another light function module 40 such that one of the light function modules 40 may slide on top of the other light function module 40 along the longitudinal direction. In some implementations, the respect fronts of the light function modules 40 may be offset along the longitudinal direction.

Figure 25:
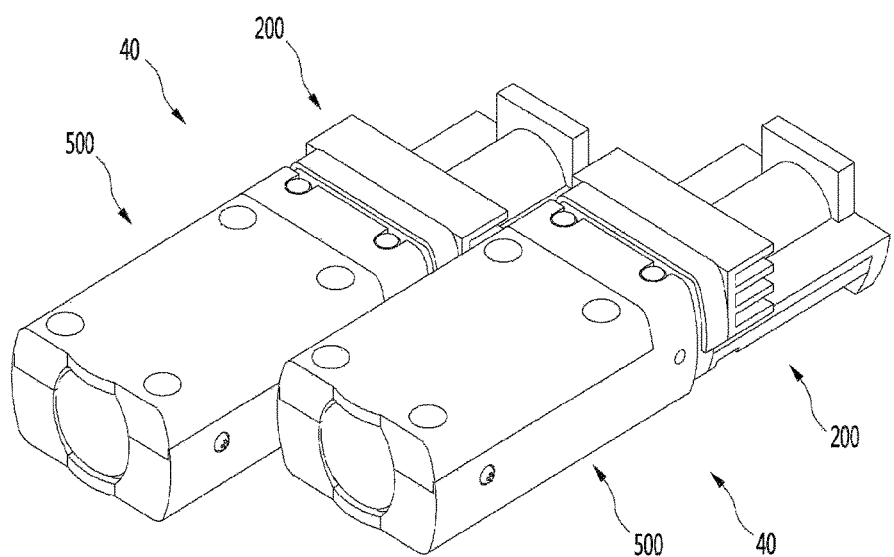
FIG. 25 is a perspective view illustrating an example of an arrangement of light function modules according to some implementations of the present disclosure.

FIG. 25 illustrates a perspective view of an example of an arrangement of light function modules according to some implementations of the present disclosure.

Referring to FIG. 25, the light lamp for a vehicle may include the plurality of light function modules 40 arranged or spaced apart from one another in a horizontal direction. In some implementations, one of the light function modules 40 may be fixed to a side of another light function module 40. In some implementations, one of the light function modules 40 may be in contact with a side of another light function module 40, but not fixed thereto. In some implementations, one of the light function modules 40 may be guided along a longitudinal direction of another light function module 40 such that one of the light function modules 40 may slide adjacent to the other light function module 40 along the longitudinal direction. In some implementations, the respect fronts of the light function modules 40 may be offset along the longitudinal direction.

Figure 26:
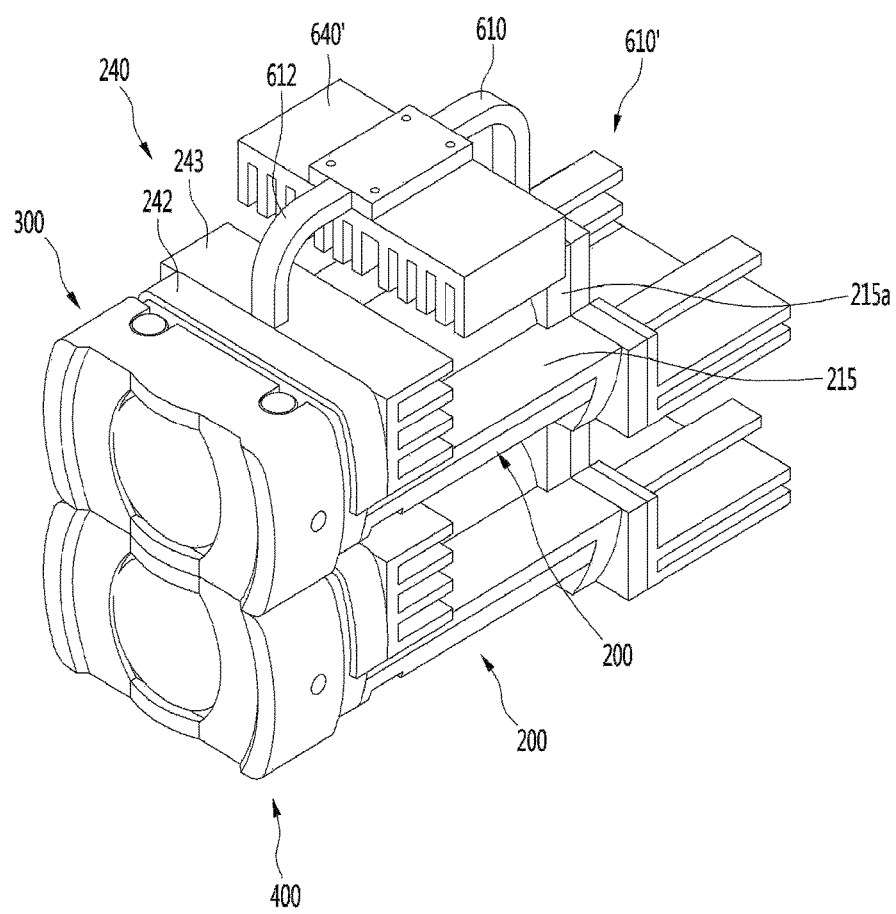
FIG. 26 is a perspective view illustrating an example of an arrangement of light function modules according to some implementations of the present disclosure.

FIG. 26 illustrates a perspective view of an example of an arrangement of light function modules according to some implementations of the present disclosure.

Referring to FIG. 26, a heat pipe 610 included in a dissipation module 600' may further include a connector 612 that is disposed to contact a phosphor 241 of a light source module 200.

In addition, the dissipation module 600' may further include a sub-dissipation plate 640' which is connected to the heat pipe 610 and disposed between the phosphor 241 and a light source 230.

The heat pipe 610 may dissipate heat generated by the light source 230 and heat generated by the phosphor 241.

Figure 27:
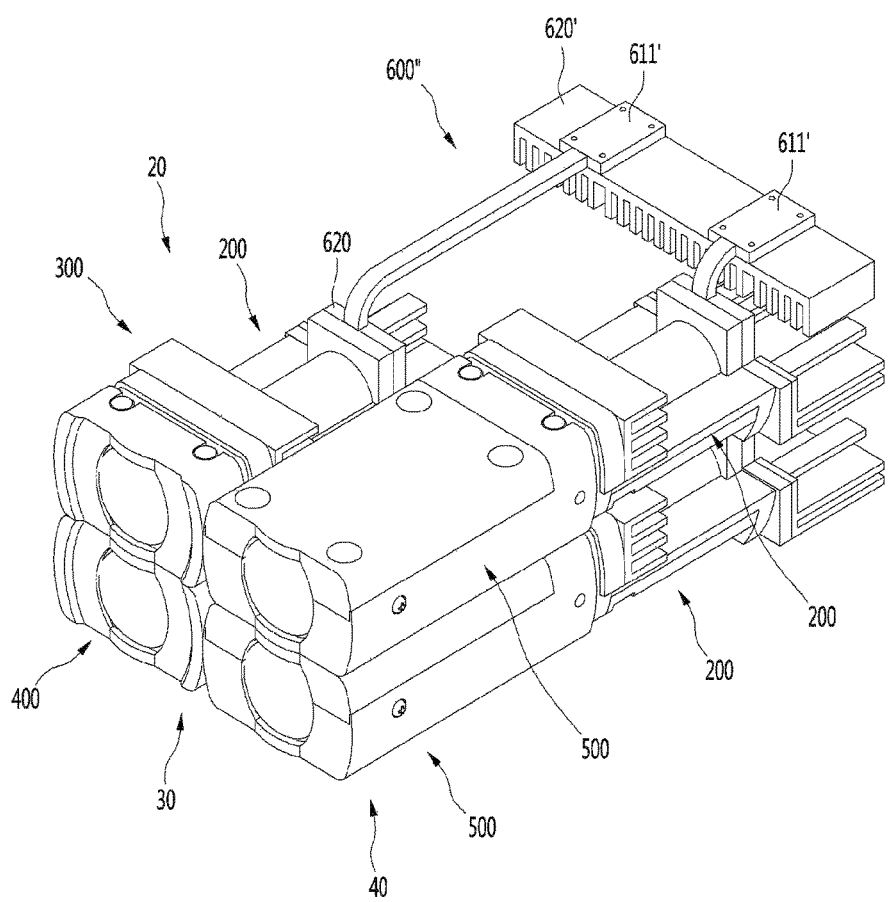
FIG. 27 is a perspective view illustrating an example of an arrangement of light function modules according to some implementations of the present disclosure.

FIG. 27 illustrates a perspective view of an example of an arrangement of light function modules according to some implementations of the present disclosure.

Referring to FIG. 27, there may be provided a plurality of dissipation modules 600", and a heat pipe 610 of each dissipation module 600" may include an extension part 611'. Each extension part 611' may be connected to a dissipation plate 620'. In some implementations, a single dissipation plate 620' may be connected to a plurality of extension parts 611'.

Figure 28:
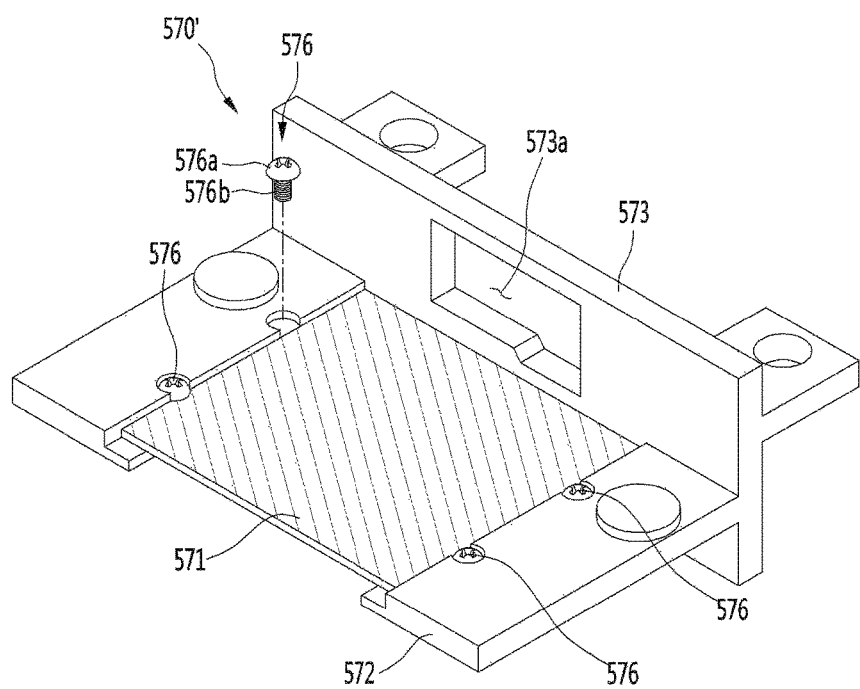
FIG. 28 is a perspective view illustrating an example of a shield retainer assembly according to some implementations of the present disclosure.

FIG. 28 illustrates a perspective view of an example of a shield retainer assembly according to some implementations of the present disclosure.

Referring to FIG. 28, a shield retainer assembly 570' may be configured to allow a mirror 571 to be mounted in the shield retainer assembly 570' using a fastening bolt 576.

To that end, the shield retainer assembly 570' may further include the fastening bolt 576. The fastening bolt 576 may include a thread 576b and a head 576a connected to the thread 576b.

The thread 576b may be fixed to a mirror mounting part 572, and the head 576a may press the mirror 571. As the head 576a presses the mirror 571, the fastening bolt 576 may fix the mirror 571 to the mirror mounting part 572.

Figure 29:
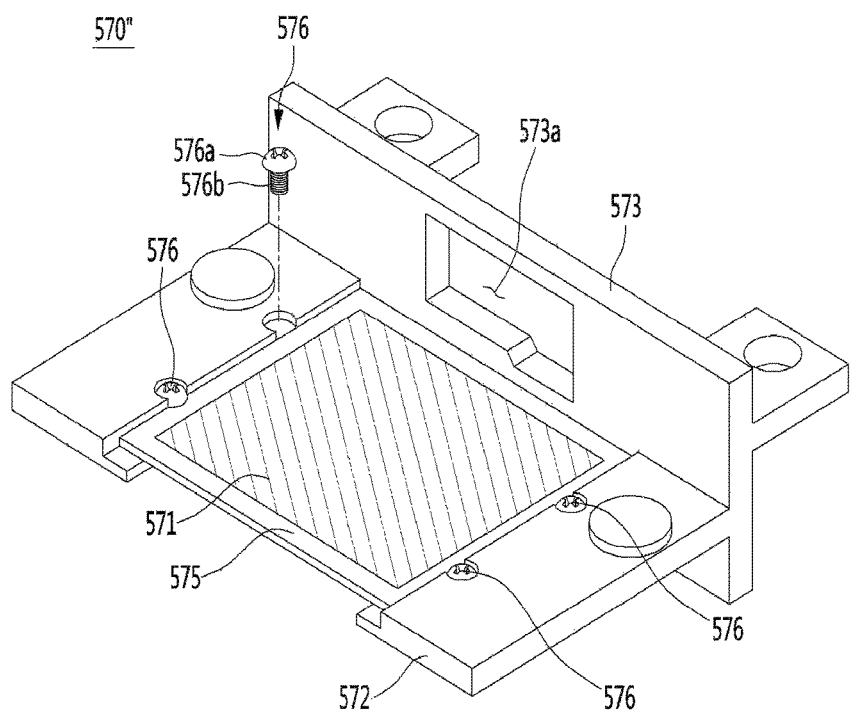
FIG. 29 is a perspective view illustrating another example of a shield retainer assembly according to some implementations of the present disclosure.

FIG. 29 illustrates a perspective view of another example of a shield retainer assembly according to some implementations of the present disclosure.

Referring to FIG. 29, a shield retainer assembly 570" may further include a mirror bracket 575 on which a mirror 571 is mounted, and the mirror bracket 575 may be fixed to a mirror mounting part 572.

The shield retainer assembly 570" may further include a fastening bolt which penetrates the mirror bracket 575 and the mirror mounting part 572. The fastening bolt 576 may include a thread 576b and a head 576a connected to the thread 576b. The thread 576b may be fixed to the mirror mounting part 572, and the head 576a may press the mirror bracket 575 and fix the mirror bracket 575 to the mirror mounting part 572.

Figure 30:
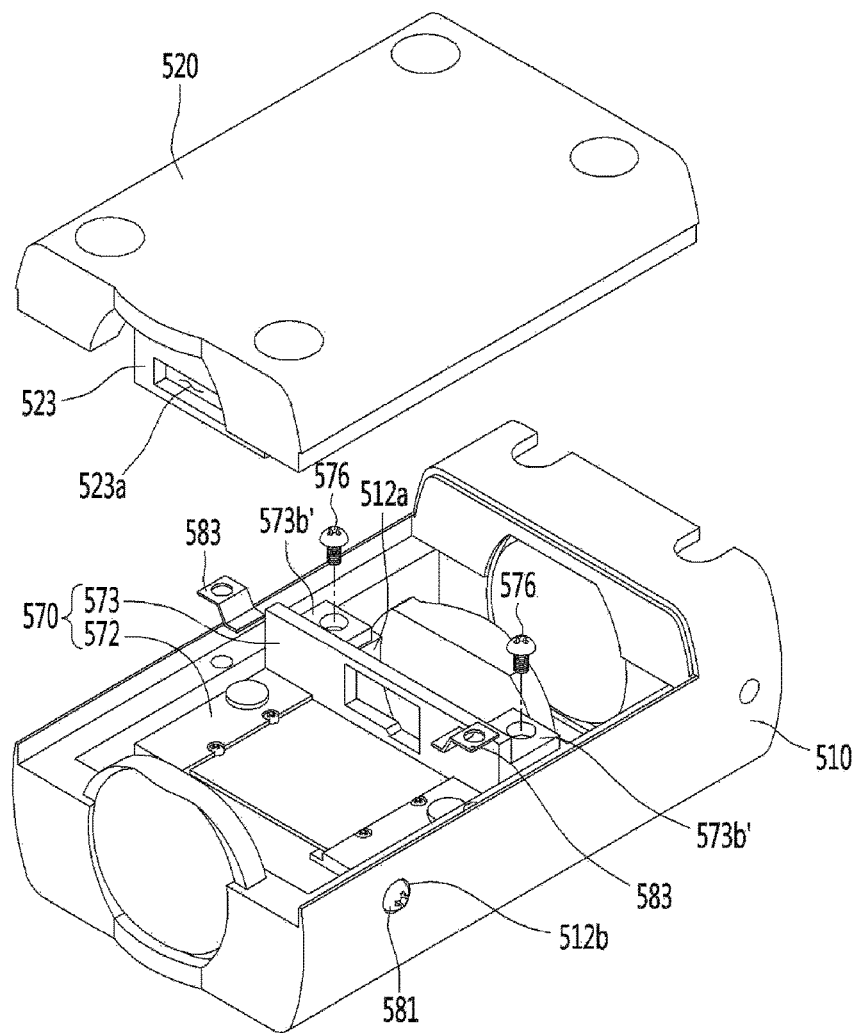
FIG. 30 is an exploded perspective view illustrating an example of a light distribution module according to some implementations of the present disclosure.

FIG. 30 illustrates an exploded perspective view of an example of a light distribution module according to some implementations of the present disclosure.

Referring to FIG. 30, a light distribution module 500 may further include a mounting part 512a protruding inwardly in a light distribution case 510. A shield retainer assembly 570 may further include a fixing part 573b' connected to the light distribution case 510, and the fixing part 573b' may be fixed to the mounting part 512a.

The light distribution module 300 may further include a fastening member 576, and the fastening member 576 may penetrate the mounting part 512a and the fixing part 573b'.

The fastening member 576 may be disposed such that a longitudinal direction of the fastening member 576 is perpendicular to a longitudinal direction of the light distribution case 510.

In such implementations where the shield retainer assembly 570 is fixed to the light distribution case 510 using the fastening member 576 that is perpendicular to the longitudinal direction of the light distribution case 510, it may be possible to omit or simplify a structure that finely adjusts the shield retainer assembly 570. When fixing the shield retainer assembly 570 to the light distribution case 510, it may be possible to adjust the shield retainer assembly 570 in a vertical direction of the light distribution case 510. Accordingly, a vertically moving coupler, such as a screw, for finely adjusting the shield retainer assembly 570 in the vertical direction may be omitted.

Figure 31:
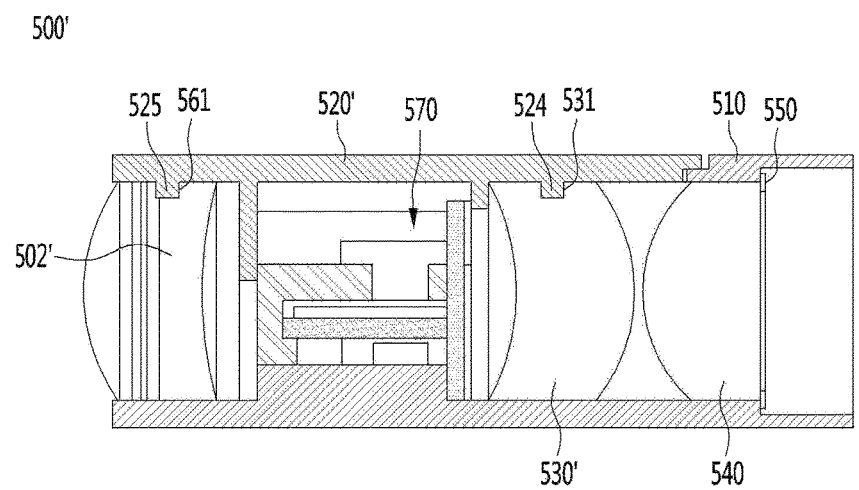
FIG. 31 is a cross-sectional view illustrating an example of a third light distribution module according to some implementations of the present disclosure.

FIG. 31 illustrates a cross-sectional view of an example of a third light distribution module according to some implementations of the present disclosure.

Referring to FIG. 31, a third light distribution module 500' may include a light distribution cover 520' including at least one pressing protrusion 524 or 525.

The pressing protrusion 524 or 525 may protrude from the bottom of the light distribution cover 520'.

A focusing lens 530' may include a front surface, a rear surface, and a circumferential surface connecting the front surface and the rear surface. The focusing lens 530' may include a groove 531 formed on the circumferential surface.

When the light distribution case 510 and the light distribution cover 520' are coupled to each other, the pressing protrusion 524 may be inserted into, and press the groove 531. Through this, the focusing lens 530' may be fixed or constrained in a vertical direction of the light distribution case 510.

A third projection lens 502' may include a front surface, a rear surface, a circumferential surface connecting the front surface and the rear surface, and a groove 561 formed on the circumferential surface. When the light distribution case 510 and the light distribution cover 520' are coupled to each other, the pressing protrusion 525 may be inserted into, and press the groove 561. Through this, the third projection lens 502' may be fixed or constrained in a vertical direction of the light distribution case 510.

Various implementations of the light lamp for a vehicle of the present disclosure may be included in a vehicle.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A light lamp for a vehicle, comprising a plurality of light function modules, each of the plurality of light function modules comprising:
    a light source module comprising:
        a light source configured to generate light;
        a light source lens disposed in front of the light source; and
        a reflection unit provided on a part of a front surface of the light source lens;
    a light distribution module disposed in front of the light source module and configured to receive the light from the light source module and to distribute the received light; and
    a dissipation module disposed behind the light source module and configured to dissipate heat generated by the light source,
    wherein the light distribution module comprises:
    a projection lens; and
    a light distribution case comprising:
        a light emission opening formed at a front side thereof; and
        a projection lens accommodating space,
    wherein the projection lens is mounted in the projection lens accommodating space,
    wherein the projection lens has a convex front surface, and at least part of the front surface is exposed to an outside of the light distribution case through the light emission opening, and
    wherein the light distribution module further comprises a projection lens retainer coupled to a rear surface of the light distribution case and configured to fix the projection lens to the light distribution case.

2. The light lamp of claim 1, wherein the light distribution module further comprises a diffuser disposed behind the projection lens retainer and facing a rear surface of the projection lens.

3. The light lamp of claim 1, wherein:
    the plurality of light function modules further comprises a first light function module and a second light function module,
    the first light function module comprises a first light distribution case on which a first projection lens is mounted,
    the second light function module comprises a second light distribution case on which a second projection lens is mounted, and
    the first projection lens and the second projection lens have different curvatures.

4. The light lamp of claim 1, wherein:
    the light source module comprises a light emission body configured to accommodate the light source and the light source lens, and
    at least part of the light emission body is inserted into a rear of the light distribution case.

5. The light lamp of claim 4, wherein:
    the light emission body comprises a top-surface protrusion protruding from a top surface thereof,
    the light distribution case further comprises a top-surface groove formed on a top surface thereof, and
    in a state in which the at least part of the light emission body is inserted into the light distribution case, the top-surface protrusion is fitted into the top-surface groove.

6. The light lamp of claim 5, wherein:
    the light emission body further comprises a bottom-surface protrusion protruding from a bottom surface thereof,
    the light distribution case further comprises a bottom-surface groove formed in a bottom surface thereof, and
    in a state in which the at least part of the light emission body is inserted into the light distribution case, the bottom-surface protrusion is fitted into the bottom-surface groove.

7. The light lamp of claim 6, wherein:
    the light emission body further comprises a plurality of top-surface protrusions and a plurality of bottom-surface protrusions, and
    a first distance between the top-surface protrusions and a second distance between the bottom-surface protrusions are different.

8. The light lamp of claim 7, wherein:
    the light emission body further comprises a side-surface groove formed in a side surface thereof,
    the light distribution case further comprises a side-surface protrusion protruding from a side surface thereof, and
    in a state in which the at least part of the light emission body is inserted into the light distribution case, the side-surface protrusion is fitted into the side-surface groove.

9. The light lamp of claim 1, wherein the plurality of light function modules comprises:
a first light function module; and
a second light function module arranged vertically above or below the first light function module.

10. The light lamp of claim 9, wherein:
a first dissipation module of the first light function module comprises a heat pipe disposed to contact a light source of the first light function module, and
the heat pipe is disposed to contact a light source of the second light function module.

11. The light lamp of claim 10, wherein the first dissipation module of the first light function module further comprises a dissipation plate in contact with the heat pipe.

12. The light lamp of claim 1, wherein the plurality of light function modules comprises:
a first light function module; and
a third light function module horizontally spaced apart from the first light function module.

13. The light lamp of claim 12, wherein:
a first dissipation module of the first light function module comprises a heat pipe disposed to contact a light source of the first light function module; and
the heat pipe is disposed to contact a light source of the third light function module.

14. The light lamp of claim 13, wherein the first dissipation module of the first light function module further comprises a dissipation plate in contact with the heat pipe.

15. The light lamp of claim 1, further comprising an inner lens disposed in front of the plurality of light function modules,
wherein the inner lens is disposed to face two or more of the plurality of light function modules.

16. The light lamp of claim 15, further comprising an outer lens disposed in front of the inner lens.

17. A vehicle comprising:
a plurality of wheels;
a power source configured to drive at least one of the plurality of wheels; and
the light lamp of claim 1.

* * * * *